United States Patent
Fujita et al.

(10) Patent No.: US 7,395,365 B2
(45) Date of Patent: Jul. 1, 2008

(54) DATA TRANSFER CONTROL SYSTEM, ELECTRONIC INSTRUMENT, PROGRAM, AND DATA TRANSFER CONTROL METHOD

(75) Inventors: Shinichiro Fujita, Kitakyushu (JP); Hiroyuki Kanai, Shiouiri (JP); Tomohiro Uchida, Sapporo (JP); Mihiro Nonoyama, Kodaira (JP)

(73) Assignee: Seiko Epson Corporation, Tokyo (JP)

( * ) Notice: Subject to any disclaimer, the term of this patent is extended or adjusted under 35 U.S.C. 154(b) by 926 days.

(21) Appl. No.: 10/625,625

(22) Filed: Jul. 24, 2003

(65) Prior Publication Data
US 2004/0034720 A1   Feb. 19, 2004

(30) Foreign Application Priority Data
Jul. 26, 2002   (JP) .............................. 2002-217595

(51) Int. Cl.
*G06F 13/38* (2006.01)
(52) U.S. Cl. .................... 710/313; 710/306; 710/311
(58) Field of Classification Search ................ 710/313, 710/306, 311
See application file for complete search history.

(56) References Cited

U.S. PATENT DOCUMENTS 6,272,644 B1 *  8/2001  Urade et al. ................. 713/320
6,445,678 B1 *  9/2002  Bard .......................... 370/219
6,542,506 B1 *  4/2003  Lee .......................... 370/395.31
2001/0005844 A1 *  6/2001  Kobayashi ..................... 707/1

FOREIGN PATENT DOCUMENTS

JP     A 2001-186157     7/2001

OTHER PUBLICATIONS

Serial Bus Protocol 2 (SBP-2), Revision 4; American National Standards Institute, Inc.; 1996,1997,1998; pp. i-v,13-17,53-55,57-62, and 65-70.*
Anderson, Don; FireWire System Architecture: Second Edition IEEE 1394a; MindShare, Inc.; 1999; pp. 265-267,273-279, and 283.*
Anderson, Don; FireWire System Architecture: Second Edition IEEE 1394a; MindShare, Inc.; 1999; pp. 219-220.*

* cited by examiner

*Primary Examiner*—Glenn A Auve
(74) *Attorney, Agent, or Firm*—Oliff & Berridge, PLC

(57) ABSTRACT

A data transfer control system includes: a port control section which controls ports P1 and P2 respectively connected with an electronic instrument PC1 and an electronic instrument PC2; and a bus reset issue section which issues a bus reset. The port P2 is set to a disabled state, and then the bus reset is issued to cause the electronic instrument PC1 to acquire an access right. The port P2 is set to an enabled state after the bus reset has been issued and the electronic instrument PC1 has acquired the access right. After the electronic instrument PC2 has been detected to be in a suspended state, a resume packet is transferred to the electronic instrument PC2. The port P2 is set to a disabled state after the power for the data transfer control system has been turned on.

13 Claims, 18 Drawing Sheets

LOGIN ORB

RECONNECT ORB

LOGOUT ORB

RESUME PACKET

DATA TRANSFER CONTROL SYSTEM, ELECTRONIC INSTRUMENT, PROGRAM, AND DATA TRANSFER CONTROL METHOD

Japanese Patent Application No. 2002-217595 filed on Jul. 26, 2002, is hereby incorporated by reference in its entirety.

BACKGROUND OF THE INVENTION

The present invention relates to a data transfer control system, an electronic instrument, a program, and a data transfer control method.

In recent years, an interface standard called IEEE1394 has attracted attention. A protocol called Serial Bus Protocol-2 (SBP-2) has been proposed as a higher level protocol including a part of the function of the transaction layer of IEEE1394. SBP-2 (SBP in a broad sense) has been proposed to enable a command set of SCSI (SPC-2) to be utilized on the protocol of IEEE1394. The command set which has been used in an electronic instrument conforming to the SCSI standard can be used in an electronic instrument conforming to the IEEE1394 standard by using SBP-2 by merely adding minimum changes to the command set. Therefore, the design and development of an electronic instrument can be facilitated.

In SBP-2, peer-to-peer data transfer is performed between an electronic instrument as an initiator (personal computer, for example) and an electronic instrument as a target (storage device, for example). Therefore, after the initiator logs in to the target and acquires an access right, the initiator exclusively possesses the access right (SBP-2 access right) to the target. Therefore, another electronic instrument cannot access the target.

There may be a case where an expansion device (an expansion electronic instrument) is provided for a notebook type personal computer (hereinafter may be called "PC") as an option for expanding the function of the notebook type personal computer. A storage device such as a hard disk drive (HDD) and a CD drive and various interfaces such as IEEE1394 and USB are provided to the expansion device. The user can utilize various functions (storage device and port) of the expansion device by connecting the notebook type PC with the expansion device. This eliminates the need to provide the expansion functions of the expansion device to the main body of the notebook type PC, whereby reduction of the weight and size of the notebook type PC can be achieved.

However, in the case of connecting the notebook type PC with the expansion device, if another PC acquires the access right to the expansion device (right to use the bus), the user cannot utilize the expansion functions of the expansion device.

BRIEF SUMMARY OF THE INVENTION

According to a first aspect of the present invention, there is provided a data transfer control system for data transfer through a bus, comprising:

a port controller which controls a plurality of ports including a first port for connecting with a first electronic instrument and a second port for connecting with a second electronic instrument; and a bus reset issue controller which issues a bus reset that clears node topology information, wherein the port controller sets the second port to a disabled state and the bus reset issue controller issues the bus reset to cause the first electronic instrument connected with the first port to acquire an access right.

According to a second aspect of the present invention, there is provided a data transfer control system for data transfer through a bus, comprising:

a port controller which controls a plurality of ports including a first port for connecting with a first electronic instrument and a second port for connecting with a second electronic instrument, wherein the port controller sets the second port to a disabled state after the power for the data transfer control system has been turned on.

DETAILED DESCRIPTION OF THE EMBODIMENT

Embodiments of the present invention are described below.

Note that the embodiments described below do not in any way limit the scope of the invention laid out in the claims herein. In addition, all elements of the embodiments described below should not be taken as essential requirements of the present invention.

1. IEEE1394 and SBP-2

1.1 Layer Structure

Figure 1:
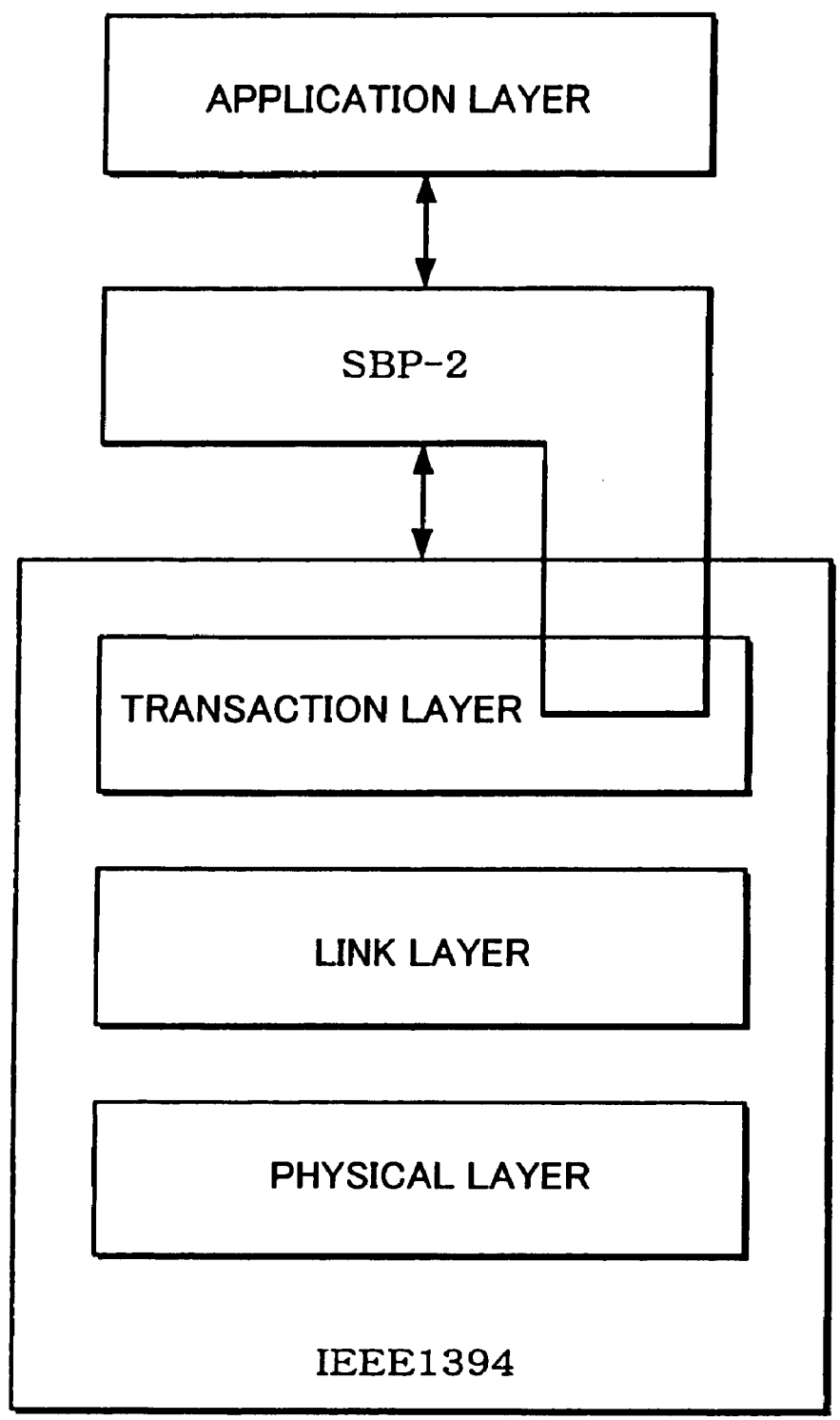
FIG. 1 is a diagram illustrative of a layer structure of IEEE1394 and SBP-2.

FIG. 1 schematically shows a layer structure (or a protocol stack) of IEEE1394 and SBP-2.

The protocols of IEEE1394 (IEEE1394-1995, P1394a, P1394b, etc.) include a transaction layer, a link layer, and a physical layer.

The transaction layer provides an upper layer with an interface (service) in a transaction unit, and performs transactions such as a read transaction, write transaction, and lock transaction through an interface provided by the link layer in a lower layer.

In the read transaction, data is transferred to a requester node from a responder node. In the write transaction, data is transferred to the responder node from the requester node. In the lock transaction, data is transferred to the responder node from the requester node, and the responder node processes the data and returns the processed data to the requester node.

The link layer provides addressing, data checking, data framing for packet transmission and reception, cycle control for isochronous transfer, and the like.

The physical layer translates logical symbols used by the link layer into electrical signals, arbitrates for the bus, and provides a physical bus interface.

SBP-2 (Serial Bus Protocol-2) has been proposed to enable the command set of SCSI (SPC-2) to be utilized on the protocol of IEEE1394 (first interface standard in a broad sense). As shown in FIG. 1, SBP-2 (SBP in a broad sense) is a higher level protocol including a part of the function of the transaction layer of IEEE1394.

1.2 Processing of SBP-2

Figure 2:
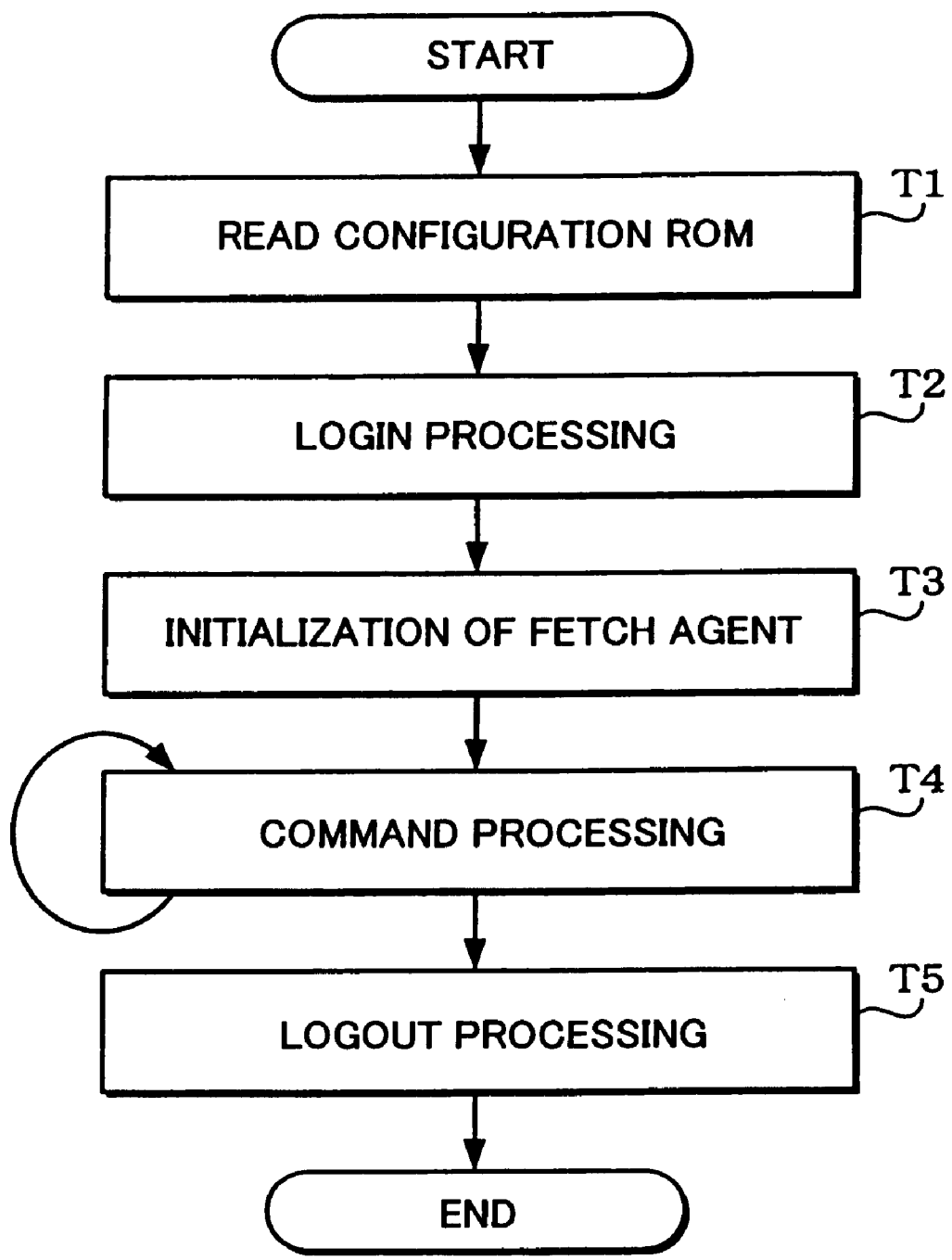
FIG. 2 is a diagram illustrative of a summary of processing of SBP-2.

FIG. 2 shows a flowchart of the entire processing of SBP-2 (first higher level protocol of the first interface standard in a broad sense).

In SBP-2, read processing of a configuration ROM is performed for confirming connected devices as shown in FIG. 2 (step T1).

Login processing for allowing an initiator (personal computer, for example) to acquire an access right to a target (storage device, for example) (request initiation permission; right to use the bus) is performed (step T2). In more detail, the login processing is performed by using a login operation request block (ORB) created by the initiator.

A fetch agent is initialized (step T3). Command processing is performed by using a command block ORB (normal command ORB) (step T4), and logout processing is performed by using a logout ORB. (step T5).

Figure 3:
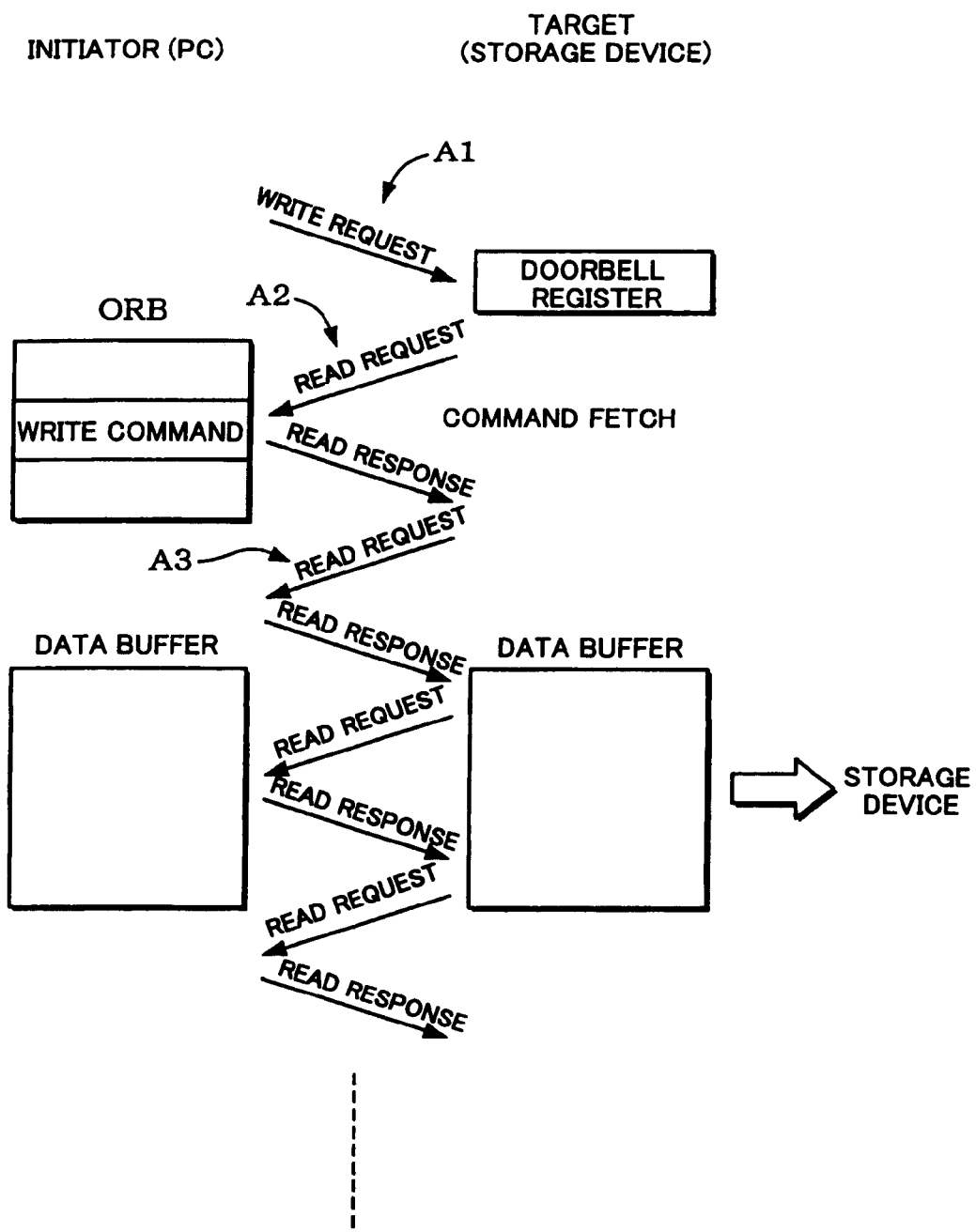
FIG. 3 is a diagram illustrative of command processing in the case of transferring data from an initiator to a target in SBP-2.

In the command processing in the step T4, the initiator transfers a write request packet (issues a write request transaction) to ring a doorbell register of the target as indicated by A1 in FIG. 3. The target transfers a read request packet, and the initiator returns a read response packet corresponding to the read request packet, as indicated by A2. This allows the ORB (command block ORB) created by the initiator to be fetched in a data buffer (packet buffer) of the target. The target analyzes a command included in the ORB fetched in the data buffer.

If the command included in the ORB is a SCSI write command, the target transfers a read request packet to the initiator, and the initiator returns a read response packet corresponding to the read request packet, as indicated by A3. This allows data stored in a data buffer of the initiator to be transferred to the target. In the case where the target is a storage device, the transferred data is written in the storage device.

Figure 4:
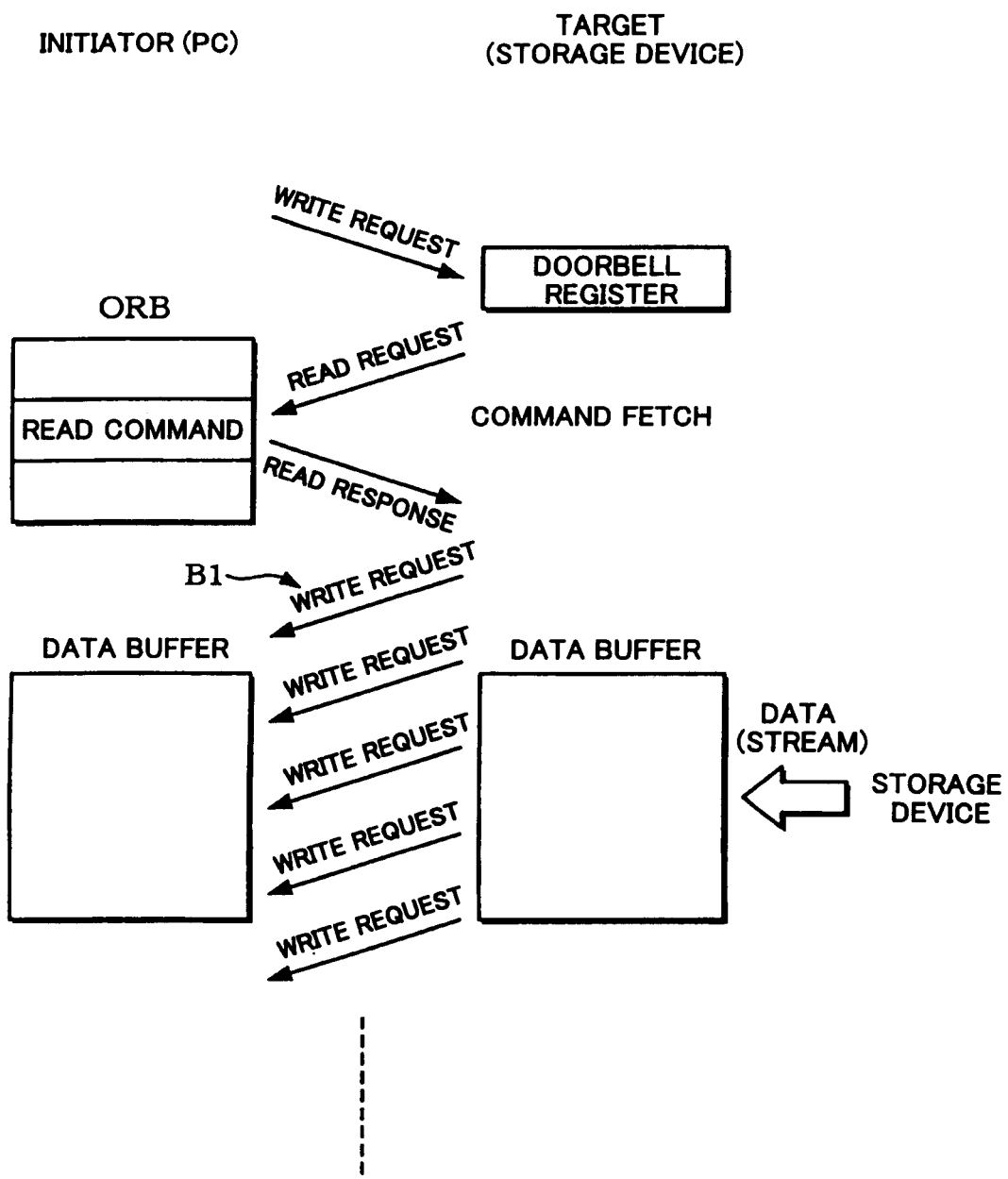
FIG. 4 is a diagram illustrative of command processing in the case of transferring data from a target to an initiator in SBP-2.

If the command included in ORB is a SCSI read command, the target transfers a series of write request packets to the initiator, as indicated by B1 in FIG. 4. In the case where the target is a storage device, data read from the storage device is transferred to the data buffer of the initiator.

According to SBP-2, the target can transmit or receive data by transferring a request packet (issuing a transaction) at its convenience. Therefore, since it is unnecessary for the initiator and the target to operate in synchronization, data transfer efficiency can be increased.

1.3 IPover1394

As higher level protocols of IEEE1394, an AV/C command which is suitable for transferring image and sound data has been proposed in addition to SBP-2 which is suitable for transferring data of a storage device or a printer. As a protocol for transferring internet protocol (IP) packets on the IEEE1394 bus, a protocol called IPover1394 has also been proposed.

Figure 5:
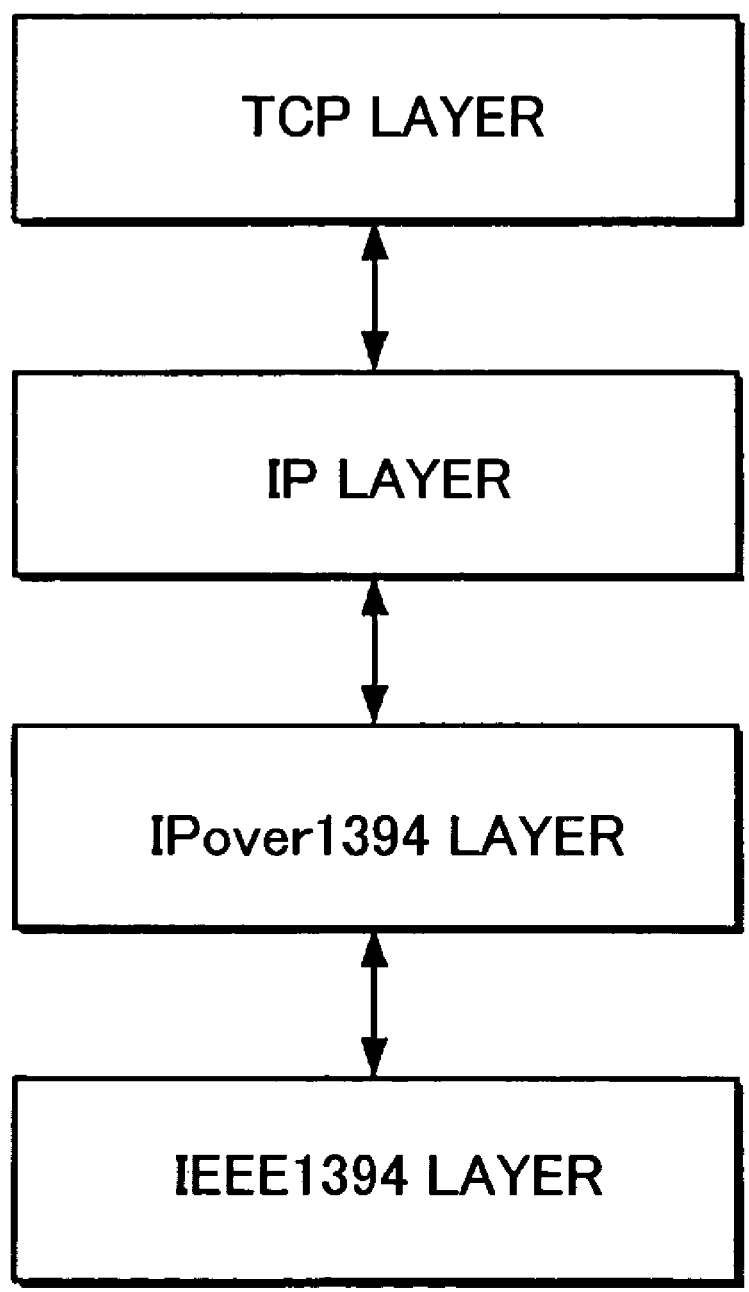
FIG. 5 is a diagram illustrative of a layer structure of IPover1394.

FIG. 5 shows a layer structure (or a protocol stack) of IPover1394 (second higher level protocol of the first interface standard in a broad sense). An IPover1394 layer is located higher than the IEEE1394 layer and is located lower than a transmission control protocol (TCP) layer and an internet protocol (IP) layer.

IPover1394 defines a specification for transferring IP packets by IEEE1394. Specifically, an IP packet obtained by adding a TCP header and an IP header to application data is divided into a plurality of 1394 packets on the transmitter side, and the 1394 packets are fragmented on the receiver side.

IPover1394 employs a protocol called an address resolution protocol (ARP). In ARP, the transmitter node broadcasts (transmits in asynchronous streams) ARP requests including a destination IP address. The receiver node returns an ARP response including link information of the receiver node. The transmitter node transmits (writes asynchronously) IP packets to the link addresses.

According to IPover1394, since it is unnecessary to secure a data transfer path in advance and each packet has address information (IP address), a packet-by-packet relay by using a router can be achieved.

1.4 Bus Reset

In IEEE1394, a bus reset occurs (is issued) when the power for a device is turned on or a device is plugged or unplugged in the middle of a transaction. Specifically, each node monitors a change in voltage of the port. If a change in voltage of the port occurs when a new node is connected with the bus or the like, a node which detects the voltage change notifies other nodes on the bus of occurrence of the bus reset. The physical layer of each node notifies the link layer of occurrence of the bus reset.

Figure 6:
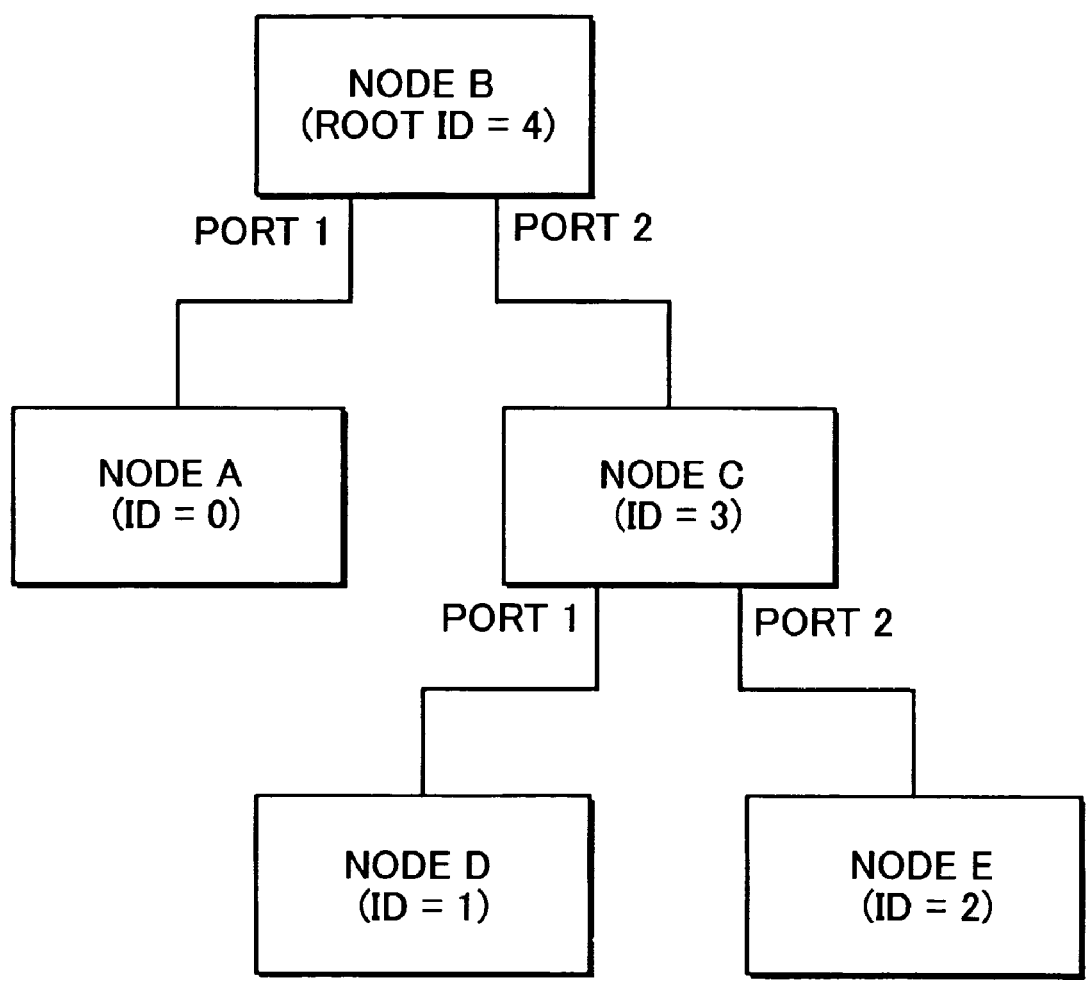
FIG. 6 is a diagram illustrative of node topology information which is cleared by a bus reset.

When the bus reset occurs, topology information (node ID and the like) shown in FIG. 6 is cleared. The topology information is then automatically recreated. Specifically, tree identify and self-identify processes are performed after the bus reset. Management nodes such as an isochronous resource manager, cycle master, and bus manager are then determined, and a normal packet transfer is resumed.

In IEEE1394, since the topology information is automatically recreated after the bus reset, a cable of an electronic instrument can be plugged or unplugged at any time, whereby a so-called hot plug can be implemented.

In the case where the bus reset occurs in the middle of a transaction, the transaction is canceled. The requester node which has issued the canceled transaction retransfers the request packet after the topology information is recreated.

The responder node must not return the response packet of the transaction canceled by the bus reset to the requester node.

1.5 Expansion Device (Electronic Instrument for Expansion, or Optional Device)

Figure 7A:
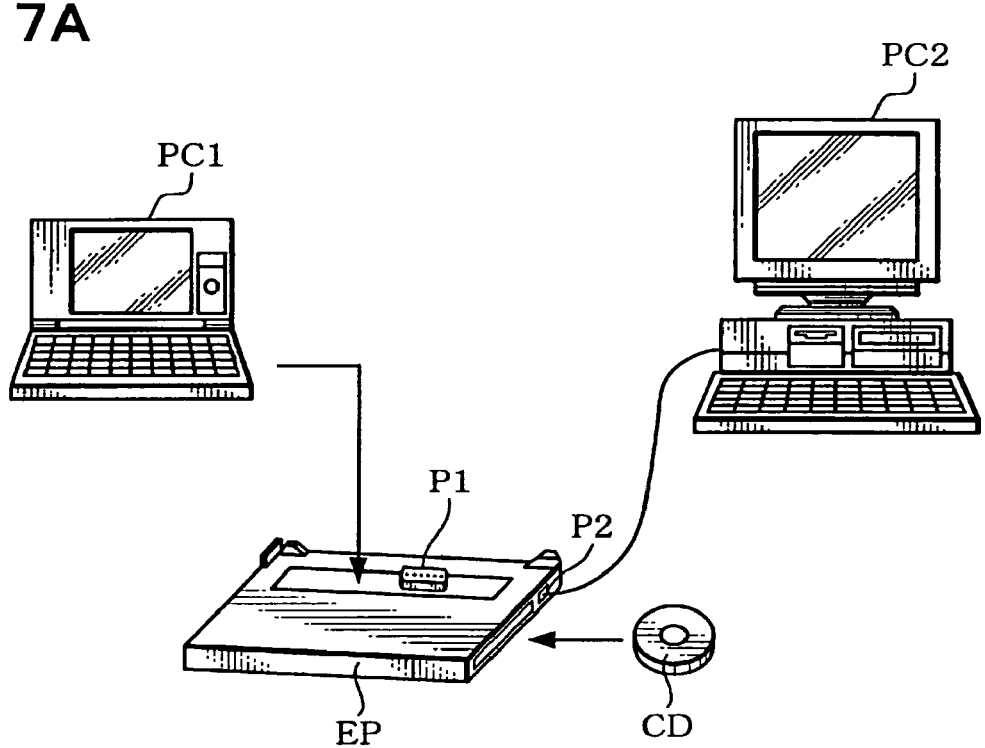
FIGS. 7A and 7B are diagrams illustrative of expansion devices.

As shown in FIG. 7A, an expansion device EP (an electronic instrument in a broad sense) may be provided for a notebook type personal computer PC1 (an electronic instrument in a broad sense) or the like for expanding the function of the notebook type personal computer PC1. The expansion device EP includes a hard disk drive (HDD) and a CD drive which reads data from or writes data to a CD (CD-R or CD-RW) (storage devices in a broad sense), and ports P1 and P2 (connectors).

In FIG. 7A, when the notebook type personal computer PC1 is connected with the expansion device EP, a port (not shown) of the notebook type personal computer PC1 is connected with the port P1 of the expansion device EP, and the power for the expansion device EP is turned on. Since terminals necessary for IEEE1394 data transfer are provided to the port P1, data transfer conforming to IEEE1394 (SBP-2) can be performed between the notebook type personal computer PC1 and the expansion device EP. This enables the notebook type personal computer PC1 to read data from or write data to the hard disk or CD.

A host computer PC2 (or an electronic instrument in a broad sense) is connected with the port P2 through a local area network (LAN) utilizing IEEE1394, for example. Data transfer using IEEE1394 (IPover1394) can be performed between the notebook type personal computer PC1 and the host computer PC2 through LAN connection.

Figure 7B:
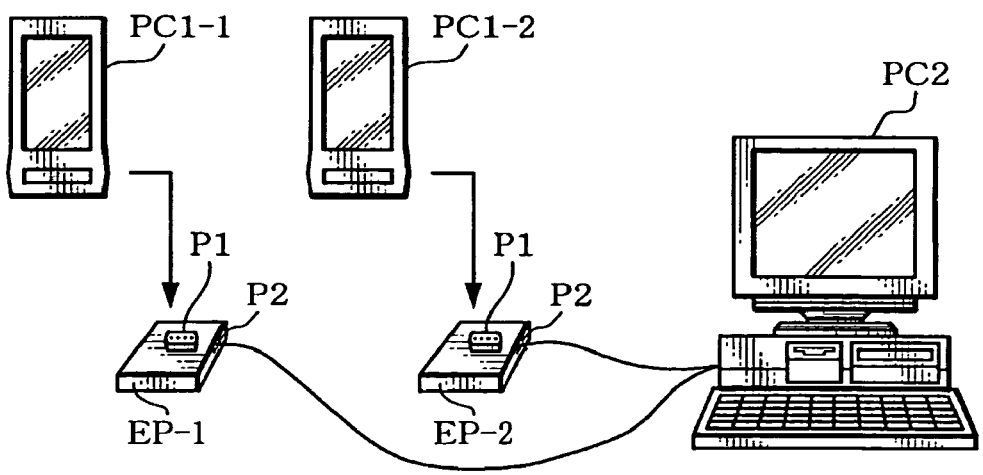

In FIG. 7B, an expansion device EP-1 and an expansion device EP-2 are respectively used as an expansion device for personal digital assistants (PDAs; or an electronic instrument in a broad sense) PC1-1 and PC1-2.

For example, the user goes out with the PDA PC1-1 and stores data in a built-in hard disk drive (HDD; storage device in a broad sense) of the PDA PC1-1. The user returns to his place and connects the PDA PC1-1 with the expansion device EP-1. This allows a port of the PDA PC1-1 to be connected with the port P1 of the expansion device EP-1, and the power for the expansion device EP-1 to be turned on. This enables the data stored in the built-in HDD of the PDA PC1-1 to be transferred to the host computer PC2 which is LAN-connected with the PDA PC1-1 by IEEE1394 through the ports P1 and P2. Therefore, the data obtained at the place where the user has been staying can be managed by using the host computer PC2.

Figure 8A:
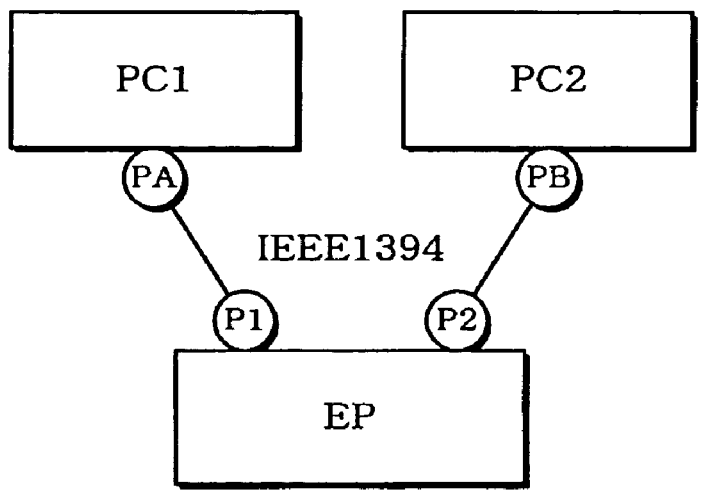
FIGS. 8A to 8C are diagrams illustrative of expansion devices.

In FIGS. 7A and 7B, the port P1 (first port) of the expansion device EP (or an electronic instrument) is connected with a port PA of the notebook type personal computer PC1 (or a first electronic instrument), as shown in FIG. 8A. The port P2 (second port) of the expansion device EP is connected with a port PB of the host computer PC2 (or a second electronic instrument). Data transfer conforming to IEEE1394 is performed between these ports.

In SBP-2, there may be a case where control becomes contradictory if a plurality of initiators log in to one target. This applies to the case where two PCs simultaneously access one HDD, for example. In the conventional method, after the initiator logs in to the target and acquires the access right, the initiator exclusively possesses the access right to the target until the initiator logs out as described with reference to FIG. 2.

Figure 8B:
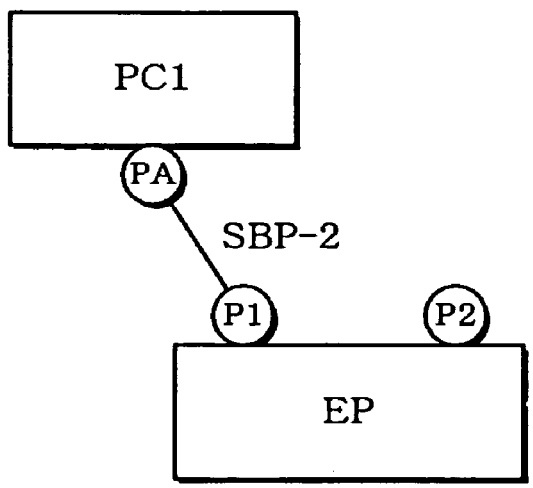
Figure 8C:
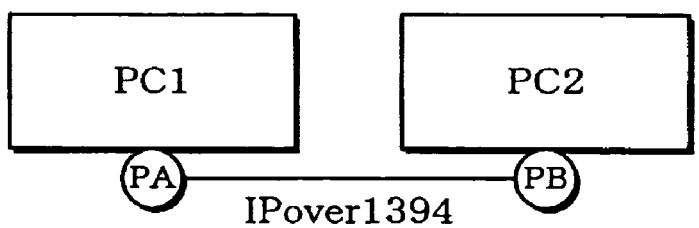

In FIG. 8B, if the notebook type personal computer PC1 as the initiator logs in to the expansion device EP as the target, the notebook type personal computer PC1 exclusively possesses the access right (SBP-2 access right) to the expansion device EP, for example. Therefore, peer-to-peer data transfer is performed between the notebook type personal computer PC1 and the expansion device EP until the notebook type personal computer PC1 logs out, for example.

However, in the connection example shown in FIG. 8A, whether the notebook type personal computer PC1 or the host computer PC2 acquires the access right is determined by an arbitration circuit of the data transfer control system included in the electronic instrument EP and the like. Therefore, there may be a case where the host computer PC2 acquires the access right to the electronic instrument EP depending on the connection timing and the like, whereby the notebook type personal computer PC1 may not acquire the SBP-2 access right to the electronic instrument EP.

This results in a problem in which the notebook type personal computer PC1 cannot use the electronic instrument EP which should function as the expansion device for the notebook type personal computer PC1, whereby convenience to the user is decreased.

Moreover, it is necessary to secure a data transfer path for IPover1394 described with reference to FIG. 5 between the notebook type personal computer PC1 and the host computer PC2.

2. Entire Configuration

Figure 9:
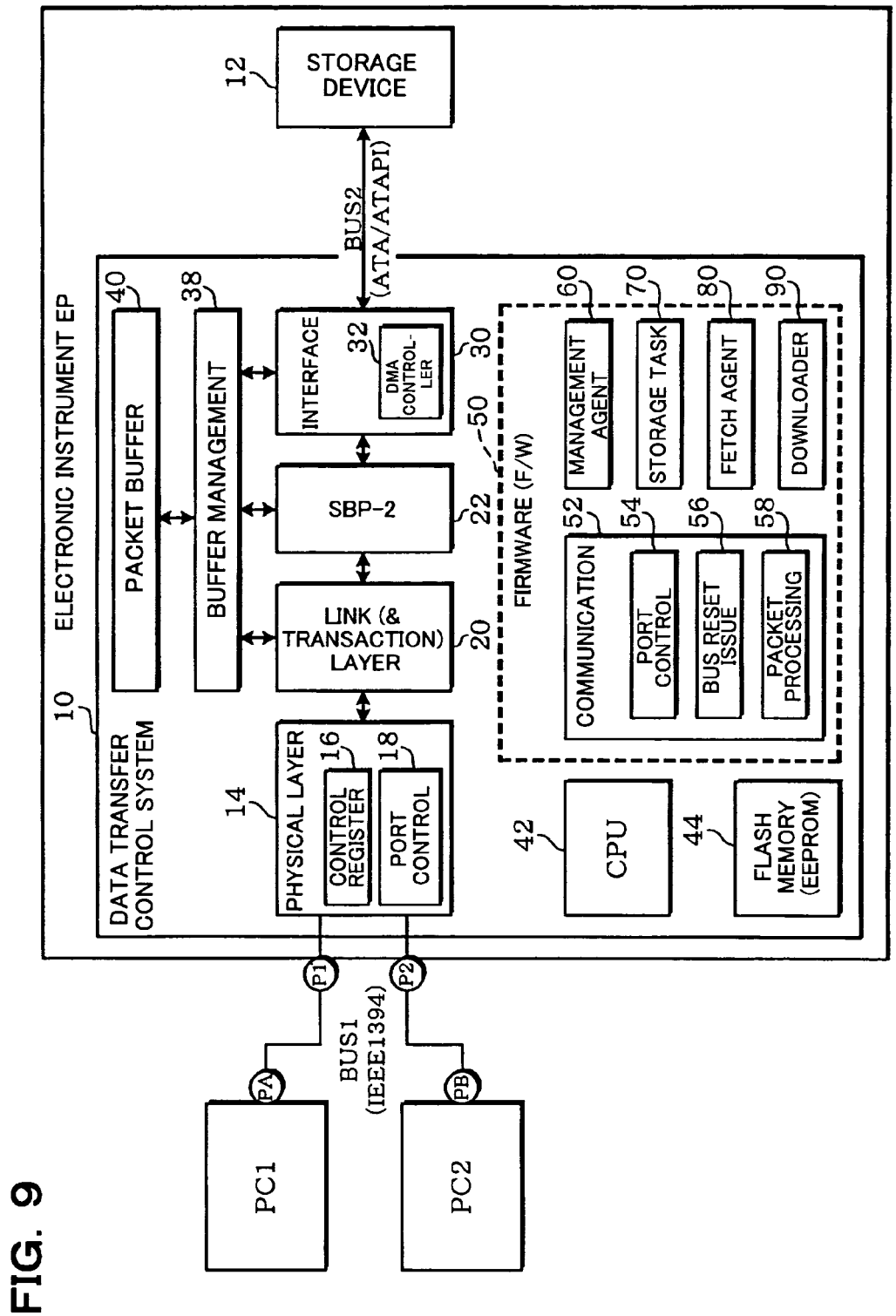
FIG. 9 is a diagram showing a configurational example of a data transfer control system and an electronic instrument in one embodiment of the present invention.

FIG. 9 shows an entire configuration example of a data transfer control system which can solve the above problems and an electronic instrument including the data transfer control system. The following description is given taking a case where a target which transfers data to or from the initiator is a storage device (CD drive, DVD drive, HDD drive, or the like) as an example. However, the present invention is not limited thereto.

An electronic instrument EP includes a data transfer control system 10 and a storage device 12 (device in a broad sense). The electronic instrument EP includes ports P1 and P2 for connection with ports PA and PB of external electronic instrument PC1 and PC2 (notebook type PC, PDA, host computer, or the like).

The electronic instrument EP may include a system CPU, a system memory (ROM and RAM), an operating section, a signal processing device, and the like (not shown).

The data transfer control system 10 includes a physical layer (PHY) circuit 14, a link layer circuit 20, an SBP-2 circuit 22, an interface circuit 30, a buffer management circuit 38, and a packet buffer 40 (data buffer). The data transfer control system 10 includes a CPU 42 and a flash memory 44 (EEPROM). The data transfer control system 10 includes firmware 50 of which processing modules (program) are stored in the flash memory 44 and which is executed by the CPU 42 (processor in a broad sense). The data transfer control system 10 in this embodiment does not necessarily include all the circuit blocks and functional blocks shown in FIG. 9. Some of the circuit blocks and functional blocks may be omitted.

The physical layer circuit 14 is a circuit for implementing the protocol of the physical layer shown in FIG. 1 by the hardware. The physical layer circuit 14 has a function of translating logical symbols used by the link layer circuit 20 into electrical signals.

A control register 16 included in the physical layer circuit 14 is a register for controlling various types of processing performed by the physical layer circuit 14. A port control circuit 18 included in the physical layer circuit 14 is a circuit which controls the ports (components in the physical layer of the node which provide a physical connection with other nodes) P1 and P2.

The link (& transaction) layer circuit 20 is a circuit for implementing a part of the protocols of the link layer and the transaction layer shown in FIG. 1 by the hardware. The link layer circuit 20 provides various services for packet transfer between the nodes.

Data transfer conforming to IEEE1394 can be performed between the electronic instrument EP and the electronic instrument PC1 or PC2 through BUS1 (first bus) by utilizing the functions of the physical layer circuit 14 and the link layer circuit 20.

The SBP-2 circuit 22 (transfer execution circuit) is a circuit which realizes a part of the protocol of SBP-2 and a part of the transaction layer by the hardware. Processing for dividing the transferred data into a series of packets and continuously transferring the divided series of packets can be implemented by the function of the SBP-2 circuit 22.

The interface circuit 30 is a circuit which performs interface processing between the data transfer control system 10 and the storage device 12. Data transfer conforming to AT Attachment (ATA) and ATA Packet Interface (ATAPI) can be performed between the data transfer control system 10 and the storage device 12 through BUS2 (second bus) by the function of the interface circuit 30.

The data transfer control system 10 can be provided with a conversion bridge function between IEEE1394 (first interface standard in a broad sense) and ATA (IDE)/ATAPI (second interface standard in a broad sense) by providing the physical layer circuit 14, the link layer circuit 20, and the interface circuit 30 as shown in FIG. 9.

A DMA controller 32 included in the interface circuit 30 is a circuit for performing direct memory access (DMA) transfer between the data transfer control system 10 and the storage device 12 through BUS2.

The buffer management circuit 38 is a circuit which manages an interface with the packet buffer 40. The buffer management circuit 38 includes registers for controlling the buffer management circuit 38, an arbitration circuit which arbitrates for bus connection to the packet buffer 40, a sequencer which generates various control signals, and the like.

The packet buffer 40 (packet memory or data buffer) is a buffer for temporarily storing packets (transferred data), and is formed by hardware such as an SRAM, SDRAM, or DRAM. In this embodiment, the packet buffer 40 functions as a randomly accessible packet storage section. The packet buffer 40 may not be included in the data transfer control system 10 and provided externally.

The CPU 42 (processor in a broad sense) controls the entire device and data transfer.

The flash memory 44 (EEPROM) is an electrically erasable programmable nonvolatile memory. The processing modules (program) of the firmware 50 are stored in the flash memory 44.

The firmware 50 is a program including various processing modules (processing routines) which operate on the CPU 42. The protocols of the transaction layer and the like are implemented by the firmware 50 and the hardware such as the CPU 42.

The firmware 50 (F/W) includes a communication section 52, a management section 60, a storage task section 70, a fetch section 80, and a downloader 90. The firmware 50 does not necessarily include all of these functional blocks. Some of the functional blocks may be omitted.

The communication section 52 is a processing module which functions as an interface between the firmware 50 and the hardware such as the physical layer circuit 14 and the link layer circuit 20.

The management section 60 (management agent) is a processing module which manages a login, reconnect, logout, reset, and the like. In the case where the initiator requests a login to the target, the management section 60 receives the login request.

The storage task section 70 is a processing module for performing data transfer processing between the data transfer control system 10 and the storage device 12 which is an application layer (upper layer) in the subsequent stage.

The fetch section 80 (fetch agent or command block agent) is a processing module for executing a command included in the command block ORB. The fetch section 80 can also handle a link list of the ORB fetched by the fetch section 80 in response to the request from the initiator, differing from the management section 60 which can handle only a single request.

The downloader 90 is a processing module for updating the processing modules of the firmware 50 stored in the flash memory 44 and the like.

The communication section 52 includes a port control section 54, a bus reset issue section 56, and a packet processing section 58.

The port control section 54 controls the port P1 (first port) to be connected with the electronic instrument PC1 and the port P2 (second port) to be connected with the electronic instrument PC2.

In more detail, the port control section 54 controls the states of the ports P1 and P2 (a disabled state, disconnected state, suspended state, resuming state, or active state). The port control is implemented by the port control section 54 (firmware) and the function of the port control circuit 18 (hardware) included in the physical layer circuit 14.

In FIG. 9, only two ports are provided. However, three or more ports may be provided. The port state (a disabled state, disconnected state, suspended state, resuming state, or active state) is defined in the P1394a standard.

The bus reset issue (occurrence) section 56 issues a bus reset (bus reset command) which clears node topology information.

In more detail, if the bus reset issue section 56 judges that the bus reset should be issued (occur), the bus reset issue section 56 sets "1" in a bit for a bus reset issue of the control register 16 included in the physical layer circuit 14, for example. This allows the bus reset to occur on BUS1 by the port control circuit 18 of the physical layer circuit 14 and the like.

In this embodiment, the port control section 54 sets the port P2 to a disables state (defined in IEEE1394) before the bus reset issue section 56 issues the bus reset for allowing the electronic instrument connected with BUS1 to acquire the access right (bus reset for prompting the electronic instrument to log in). In more detail, the port control section 54 sets the port P2 to a disabled state before the bus reset issue section 56 issues the bus reset for allowing the electronic instrument to acquire the access right after the power for the data transfer control system 10 (electronic instrument EP) is turned on.

This sets the port P1 to an enabled state (or a state in which the state of the bus signal can be detected; a state in which the port can take part in a reset, tree identify, self-identify, or arbitration phase; an active state; or a state other than a disabled state), and also sets the port P2 to a disabled state (or a state in which the port does not generate signals and cannot detect signals although the port is physically connected with other ports; or a state in which the port neither transmits nor receives the bus signal). Therefore, the electronic instrument PC1 (notebook type PC, PDA, or the like) connected with the port P1 can acquire the access right (right to log in) to the electronic instrument EP as the target in preference to the electronic instrument PC2 (host computer or the like) connected with the port P2. As a result, the electronic instrument PC1 as the initiator can exclusively perform peer-to-peer data transfer conforming to SBP-2 between the electronic instrument PC1 and the electronic instrument EP as the target.

After the bus reset is issued and the electronic instrument PC1 connected with the port P1 acquires the access right, the port control section 54 sets the port P2 to an enabled state (or an active state). If the electronic instrument PC2 connected with the port P2 is detected to be in a suspended state after the port P2 is set to an enabled state, the packet processing section 58 transfers a packet for resuming from a suspended state to the electronic instrument PC2. Data transfer conforming to IPover1394 described with reference to FIG. 2 can be performed between the electronic instrument PC1 and the electronic instrument PC2 by allowing the bus reset issue section 56 to issue the bus reset after the resume packet is transferred.

3. Processing Details

Details of processing in this embodiment are described below using flowcharts shown in FIGS. 10 and 11 and the like.

When the power for the data transfer control system 10 (electronic instrument EP) is turned on, the ports P1 and P2 are set to an enabled state (step S1). Or, the ports P1 and P2 are set to an enabled state at the same time as the power on. The link layer circuit 20 is set to a disabled state (or a non-operating state) (step S2).

Figure 12A:
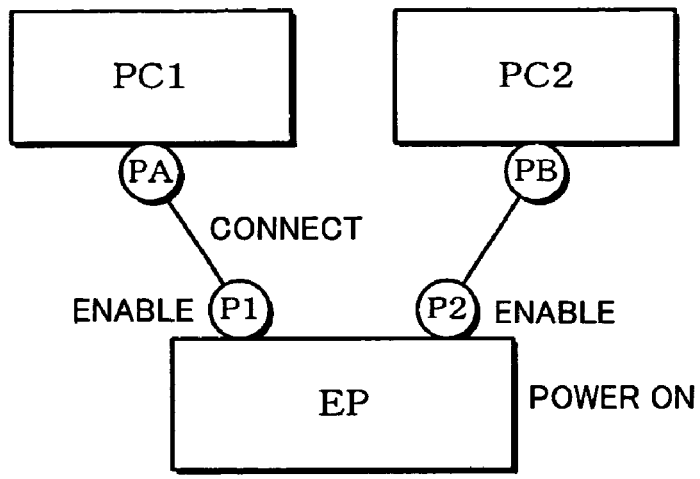
FIGS. 12A to 12C are diagrams illustrative of a port control method.

In more detail, as shown in FIG. 12A, when the electronic instrument PC1 is connected with the electronic instrument EP (see FIGS. 7A and 7B), the power for the electronic instrument EP (an expansion device for the electronic instrument PC1) is turned on, whereby the power for the data transfer control system 10 (transfer control IC) included in the electronic instrument EP is turned on (bus reset occurs at the same time). The register (a D flip-flop, memory or the like) which stores the port state is initialized by power-on reset, whereby the register becomes in an enabled (or an active) state.

Figure 12B:
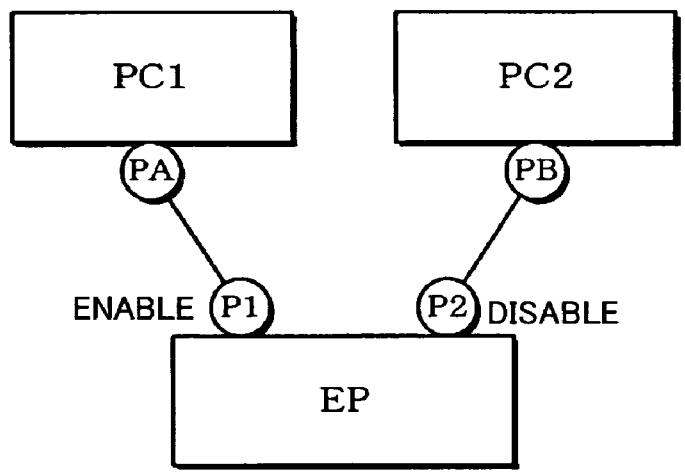

The port P2 is then set to a disabled state (step S3). Since the port P1 has been set to an enabled state in the step S1, the port P1 is in an enabled state and the port P2 is in a disabled state, as shown in FIG. 12B. The port state is set by the port control circuit 18 and the port control section 54.

Whether or not the initialization processing of the data transfer control system 10 (physical layer circuit 14) has been finished is judged (step S4). If the initialization processing has been finished, the link layer circuit 20 is set to an enabled state and starts to operate (step S5).

Figure 12C:
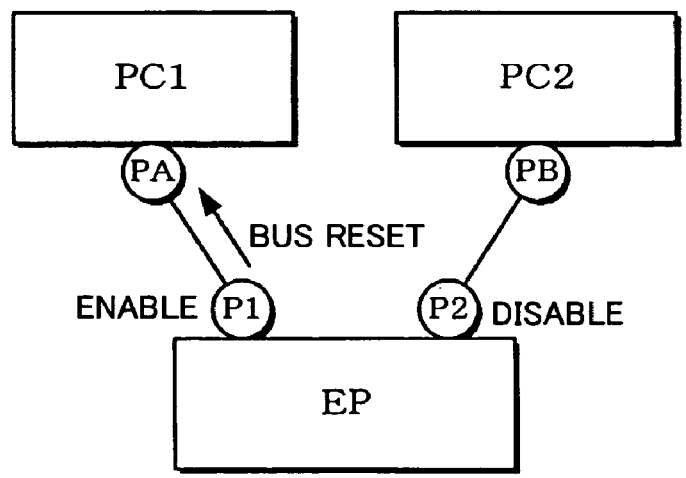
Figure 13A:
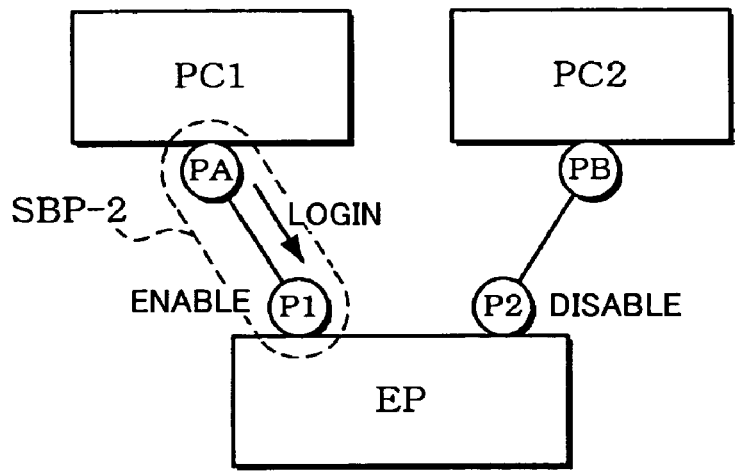
FIGS. 13A to 13C are diagrams illustrative of a port control method.

As shown in FIG. 12C, the bus reset issue section 56 issues the bus reset (or makes the bus reset occur) for prompting the electronic instrument PC1 connected with the port P1 to log in (acquire the access right) (step S6). As shown in FIG. 13A, the electronic instrument PC1 (notebook type PC, PDA, or the like) connected with the port P1 logs in to the electronic instrument EP (or an expansion device) (step S7). If the electronic instrument PC1 succeeds in logging in, data transfer conforming to SBP-2 can be performed between the electronic instrument PC1 as the initiator and the electronic instrument EP as the target.

In this case, since the port P2 is in a disabled state, the electronic instrument PC2 (host computer) connected with the port P2 cannot recognize the bus reset. Therefore, the electronic instrument PC2 connected with the port P2 is prevented from logging in to the electronic instrument EP, whereby contention of logins (access right acquisition) does not occur. This enables the electronic instrument PC1 to log in to the electronic instrument EP. As a result, the electronic instrument PC1 as a parent can exclusively use the storage device 12 of the electronic instrument EP as a child (or an expansion device), whereby convenience to the user can be increased.

Figure 13B:
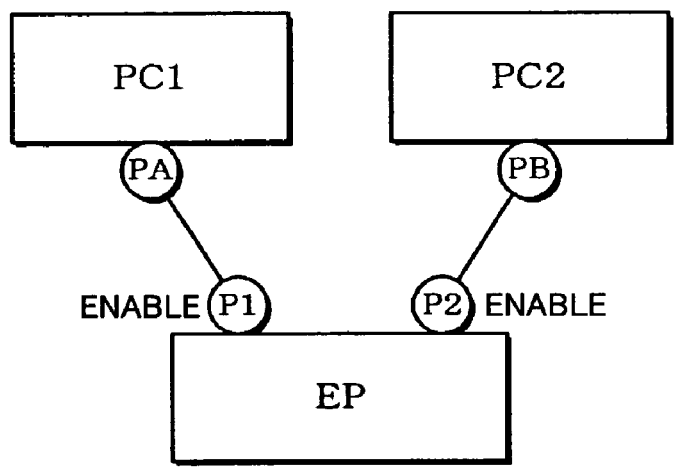
Figure 13C:
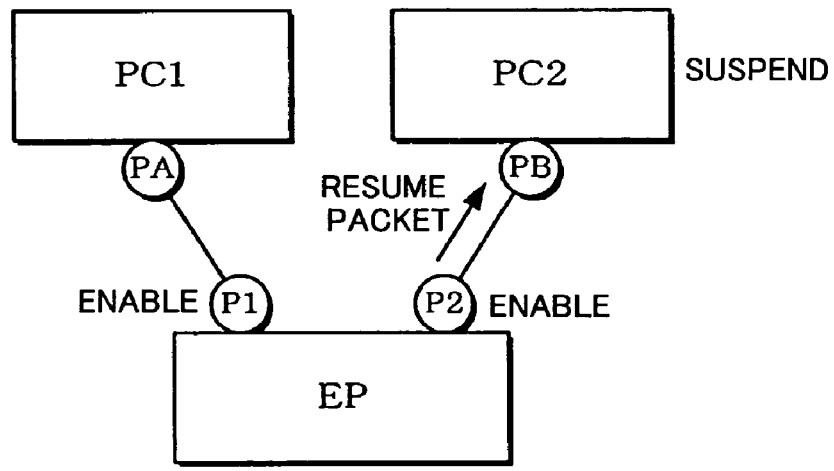

If the electronic instrument PC1 succeeds in logging in, the state of the port P2 is changed from a disabled state to an enabled state, as shown in FIG. 13B (step S8). Then, whether or not the electronic instrument PC2 is in a suspended state (connected=1, bias=0) is judged (step S9). If the electronic instrument PC2 is in a suspended state, a resume packet is transferred to the electronic instrument PC2 from the electronic instrument EP as shown in FIG. 13C (step S10).

Specifically, the electronic instrument PC2 connected with the port P2 may transition to a suspended state if the port P2 is set to a disabled state.

In this embodiment, the resume packet is transferred to the electronic instrument PC2 in order to allow the electronic instrument PC2 (physical layer circuit) which has transitioned to a suspended state to transition to the active state.

However, the resume packet is a packet newly defined in the P1394a standard. Therefore, if the electronic instrument PC2 does not conform to the P1394a standard, the electronic instrument PC2 does not transition to a suspended state even if the port P2 is set to a disabled state. Therefore, it is unnecessary to transfer the resume packet. In this embodiment, the resume packet is transferred to the electronic instrument PC2 only in the case where the electronic instrument PC2 is judged to be in a suspended state as indicated by the steps S9 and S10 in FIG. 11. Therefore, it is possible to appropriately deal with not only the case where the electronic instrument PC2 conforms to the P1394a standard, but also the case where the electronic instrument PC2 does not conform to the P1394a standard.

Figure 14A:
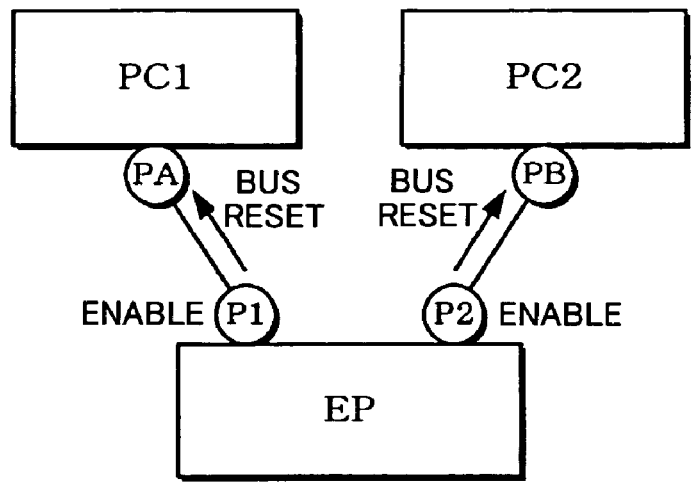
FIGS. 14A to 14C are diagrams illustrative of a port control method.

As shown in FIG. 14A, the bus reset issue section 56 issues the bus reset (step S11). This prompts the electronic instrument PC1 to reconnect, and the electronic instrument to log in.

Figure 14B:
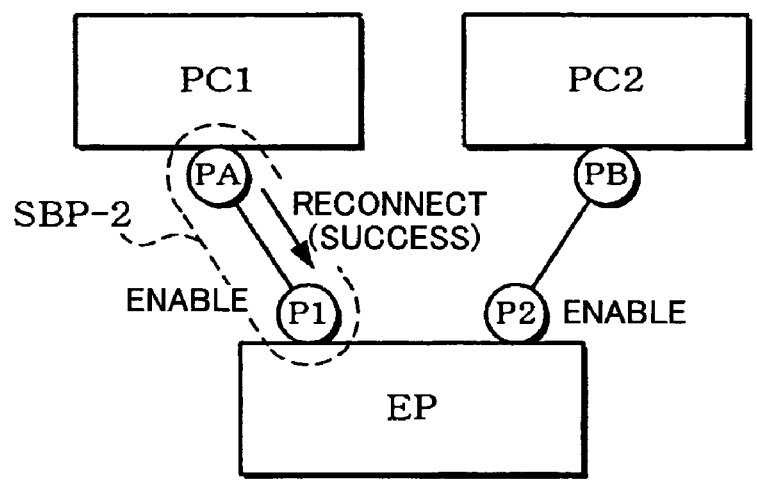
Figure 14C:
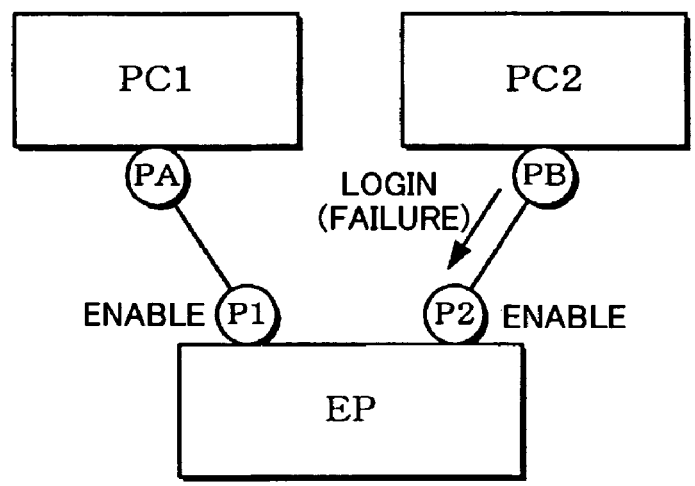

As shown in FIG. 14B, the electronic instrument PC1 attempts reconnecting with the electronic instrument EP and succeeds in reconnecting (step S12). As shown in FIG. 14C, the electronic instrument PC2 attempts logging in to the electronic instrument EP, but fails in logging in because the electronic instrument PC1 has already reconnected with the electronic instrument EP (step S13).

In SBP-2, an initiator which had logged in to a target before occurrence of the bus reset can preferentially reconnect with the target for a given period after occurrence of the bus reset. If the initiator does not reconnect with the target, another initiator (or an electronic instrument) can log in to the target.

In this embodiment, the access right to the electronic instrument EP is appropriately managed by making use of the mechanism of the reconnect processing of SBP-2.

Figure 10:
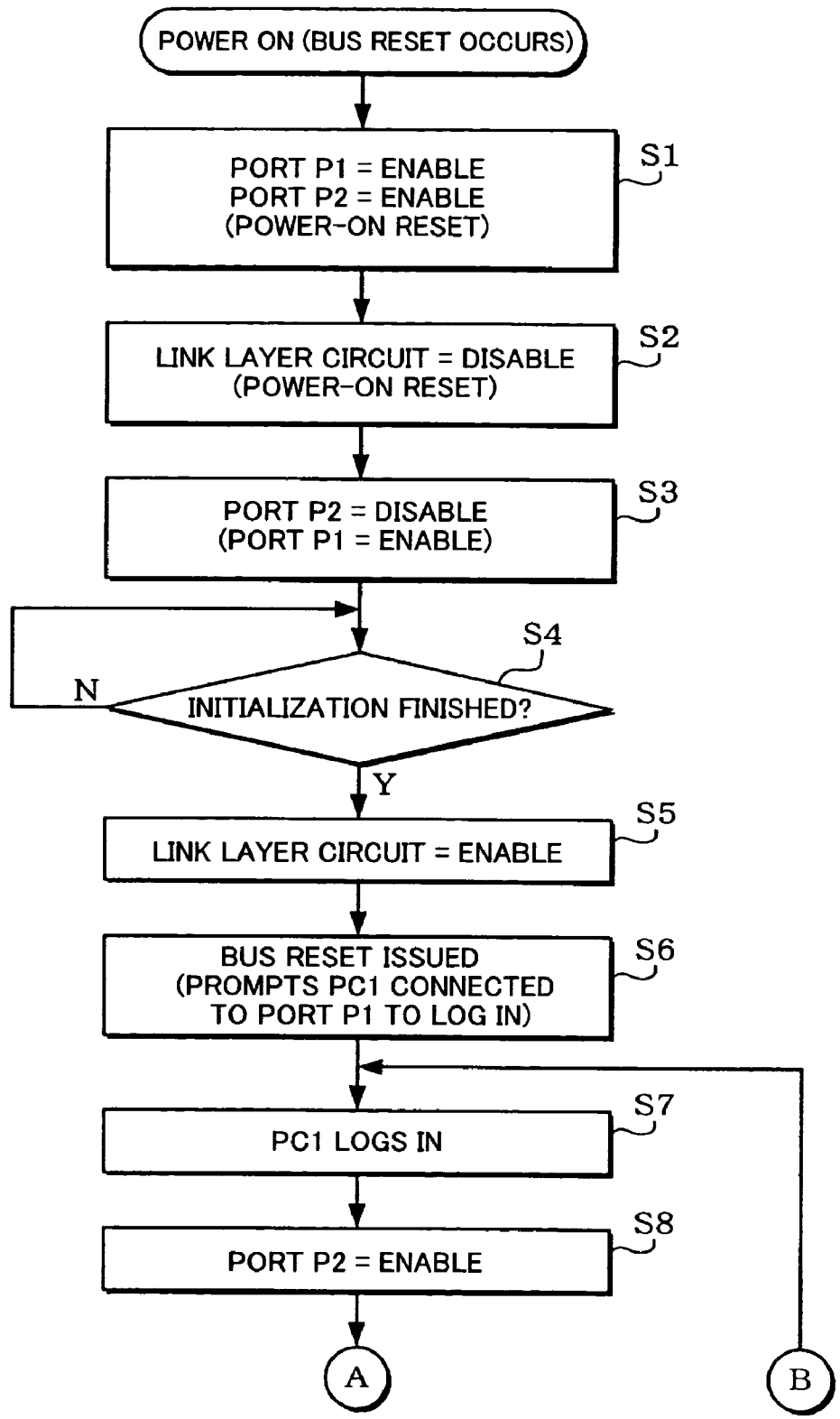
FIG. 10 is a flowchart showing a detailed processing according to one embodiment of the present invention.

Specifically, the node topology information must be cleared in order to set the port P2 to an enabled state in the step S8 in FIG. 10 and to add the electronic instrument PC2 as a new node. Therefore, the bus reset must be issued. However, if the electronic instrument PC2 acquires the access right to the electronic instrument EP by the bus reset issue, convenience to the user is decreased.

Figure 11:
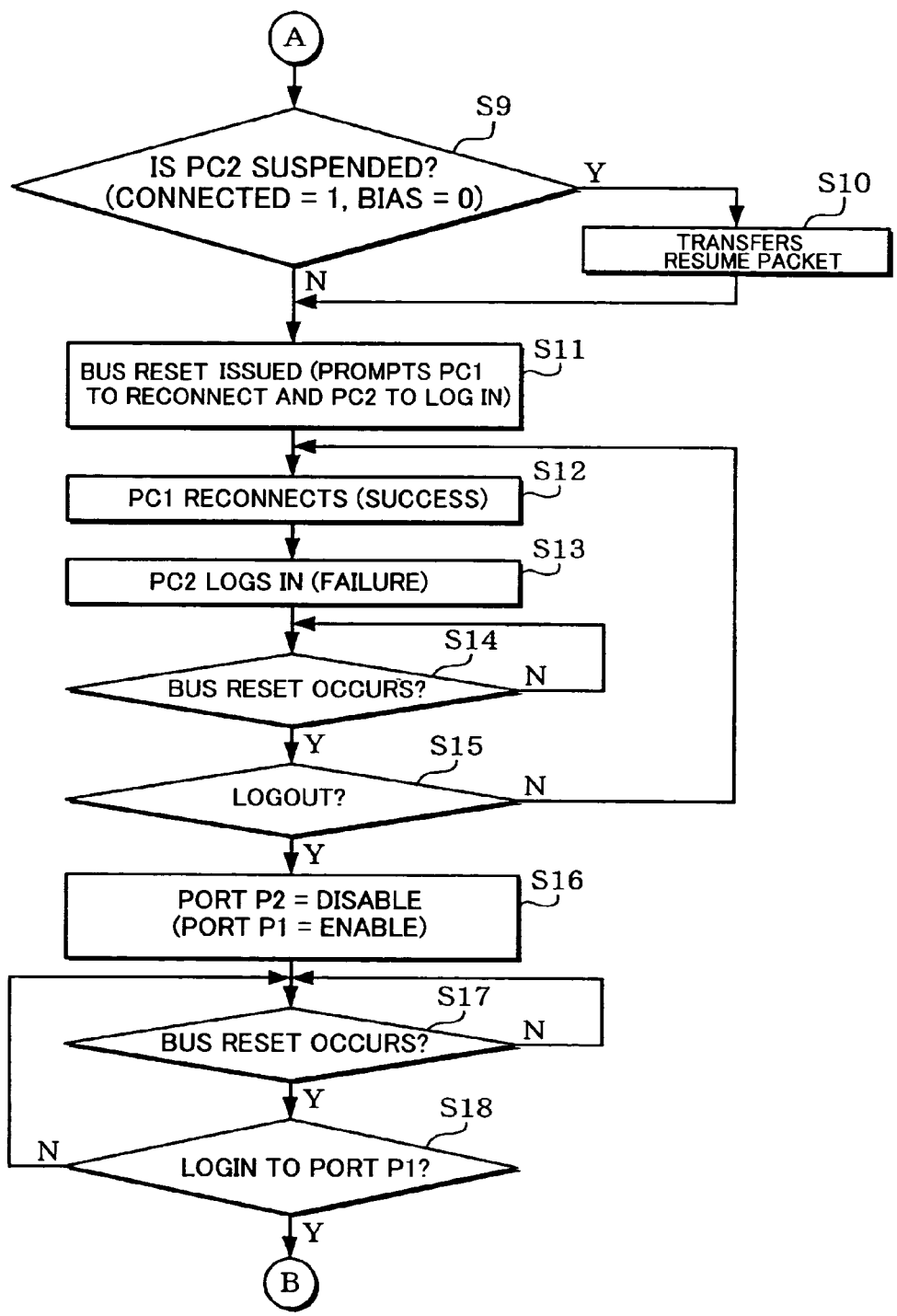
FIG. 11 is a flowchart showing a detailed processing according to one embodiment of the present invention.

In this embodiment, since the bus reset is issued at the timing of the step S11 in FIG. 11, the electronic instrument PC1 can preferentially acquire the access right to the electronic instrument EP after the bus reset by utilizing the mechanism of the reconnect processing of SBP-2.

Figure 15A:
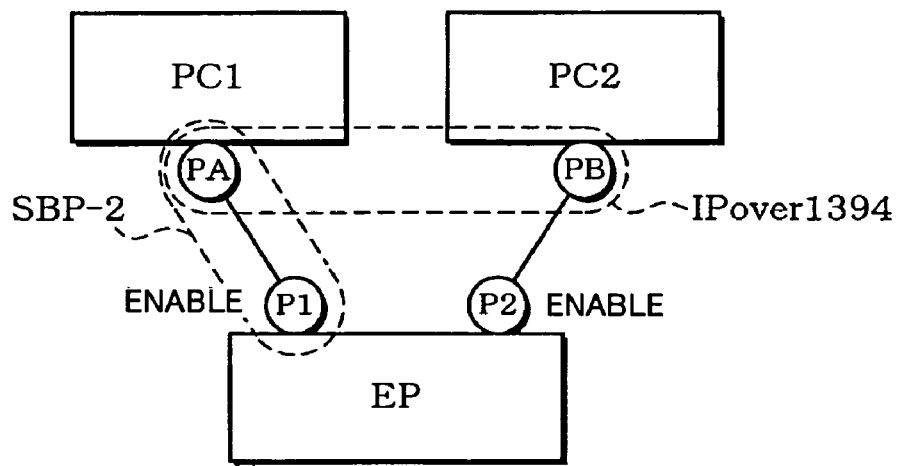
FIGS. 15A to 15C are diagrams illustrative of a port control method.

Moreover, since the node topology information is cleared by the bus reset, the electronic instrument PC2 is recognized as a new node. Therefore, not only SBP-2data transfer between the electronic instrument PC 1 and the electronic instrument EP, but also IPover1394 data transfer (see FIG. 5) between the electronic instrument PC1 and the electronic instrument PC2 can be performed, as shown in FIG. 15A. As a result, data obtained by the electronic instrument PC1 can be transferred to the electronic instrument PC2 as a server and managed by using the electronic instrument PC2.

Figure 15B:
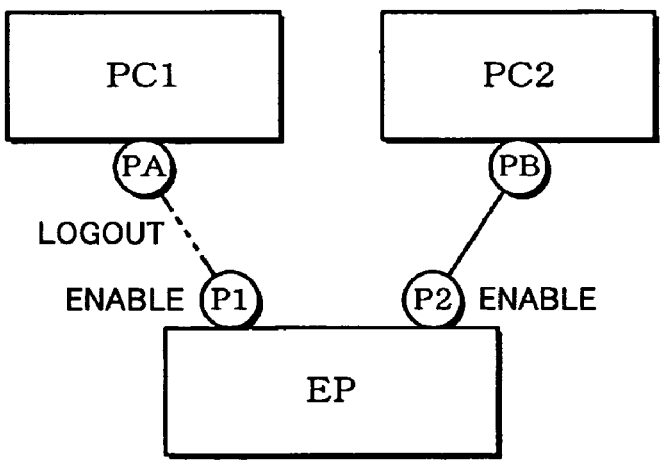

As indicated by the step S14 in FIG. 11, whether or not the bus reset has occurred is judged. If the bus reset has occurred, whether or not the electronic instrument PC1 has logged out (whether or not the electronic instrument PC1 connected with the port P1 has lost the access right to the electronic instrument EP in a broad sense) is judged as shown in FIG. 15B (step S15).

The "logout" in the step S15 in FIG. 11 includes a case where the electronic instrument PC1 is unplugged in a software manner, a case where the cable is removed from the port P1, and a case where a forced logout occurs when the power for the electronic instrument PC1 is turned off (electronic instrument PC1 is rebooted or enters a power saving mode).

Whether or not the bus reset has occurred is judged in the step S14 for the following reason.

The electronic instrument PC1 accesses (reads data from or writes data to) the storage device 12 after the electronic instrument PC2 fails to log in in the step S13. Therefore, since the electronic instrument PC1 does not log out in the case where the bus reset occurs during a period in which the electronic instrument PC1 is accessing the storage device 12, the processing transitions to the steps S14, S15, and S12, and the electronic instrument PC1 performs the reconnect processing. If the electronic instrument PC1 succeeds in the reconnect processing, the electronic instrument PC1 can continue accessing the storage device 12.

In the case where the electronic instrument PC1 logs out, specifically, in the case where the electronic instrument PC1 is unplugged or the power for the electronic instrument PC1 is turned off, the bus reset always occurs. Therefore, whether or not the bus reset has occurred is judged in the step S14, and, if the bus reset has occurred, whether or not the electronic instrument PC1 has logged out is judged in the step S15.

If the electronic instrument PC1 is determined to have logged out in the step S15, the port P2 is returned to a disabled state from an enabled state (step S16). The port P1 remains to be in an enabled state.

Whether or not the bus reset has occurred is then judged (step S17). This is because the bus reset should occur since the electronic instrument PC 1 has logged out in the step S15. If the bus reset has occurred, whether or not the electronic instrument PC1 is logging in to the port P1 is judged (step S18). If the electronic instrument PC1 is not logging in to the port P1, the processing returns to the step S17. If the electronic instrument PC1 is logging in to the port P1, the processing transitions to the step S7 in FIG. 10.

Therefore, it is possible to appropriately deal with a case where the electronic instrument PC1 is rebooted, a case where the electronic instrument PC1 transitions to the power saving mode (suspended or hibernated), a case where the cable is removed from the port P1, and the like.

Specifically, the electronic instrument PC1 necessarily logs out when the electronic instrument PC1 is rebooted (turned on), whereby the electronic instrument PC1 loses the access right to the electronic instrument EP. In this case, if the port P2 remains to be in an enabled state, contention of logins of the electronic instrument PC1 and the electronic instrument PC2 occurs. Therefore, the electronic instrument PC1 may not acquire the access right (log in) to the electronic instrument EP after the electronic instrument PC1 is rebooted.

Figure 15C:
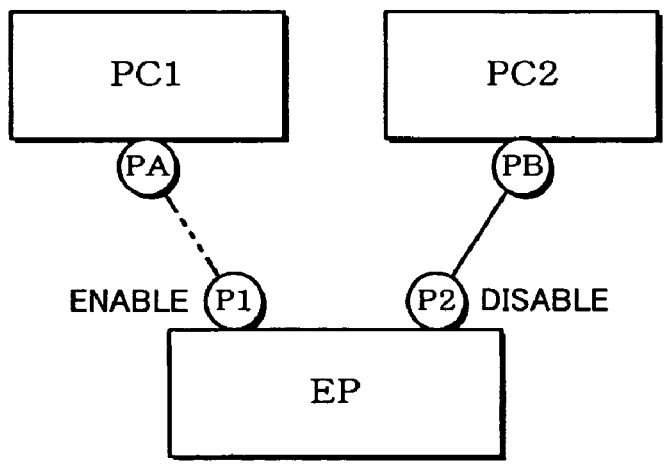

If the port P2 is set to a disabled state as shown in FIG. 15C, the electronic instrument PC1 can preferentially acquire the access right (log in) to the electronic instrument EP. Therefore, occurrence of a problem in which the electronic instrument PC2 acquires the access right when the electronic instrument PC1 is rebooted or the like can be prevented.

According to this embodiment, the electronic instrument PC1 can be allowed to exclusively possess the access right to the electronic instrument EP, even if various changes in conditions occur, by performing the processing of the port state setting, the bus reset issue, the resume packet transfer, and the like in the order shown in FIGS. 10 and 11. Moreover, an identifier (GUID) of the electronic instrument PC1 is not necessary to be stored in the electronic instrument EP. Therefore, a data transfer control system which is capable of increasing convenience to the user and is suitably incorporated into an expansion device can be provided.

4. Packet Format

FIGS. 16A, 16B, 17A, and 17B show formats of various packets used in the processing shown in FIGS. 10 and 11.

Figure 16A:
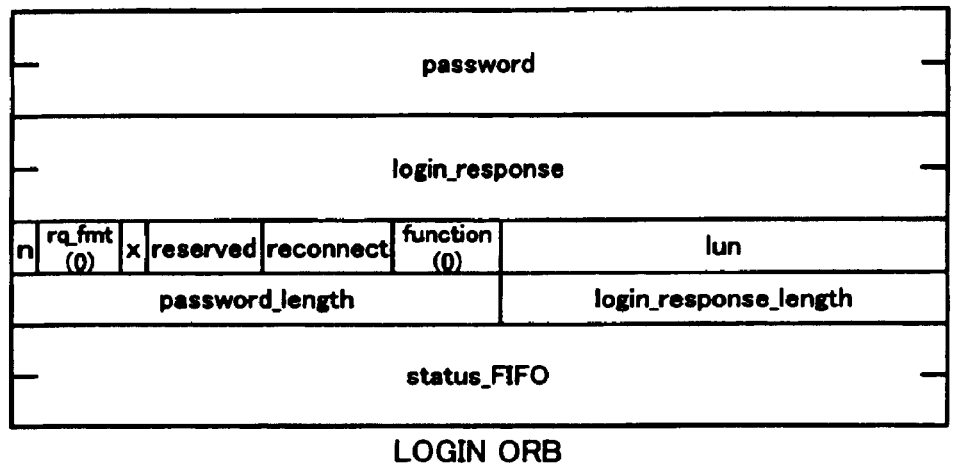
FIGS. 16A and 16B are diagrams showing formats of packets used in one embodiment of the present invention.
Figure 16B:
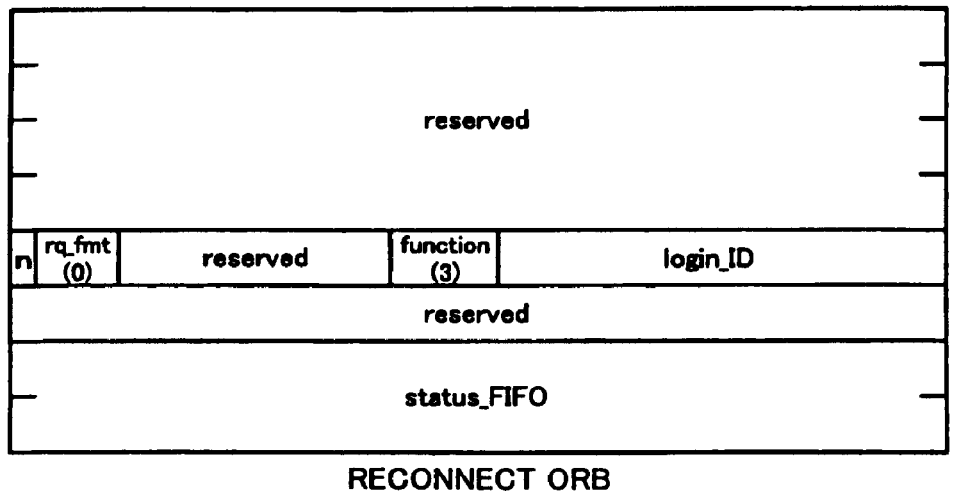
Figure 17A:
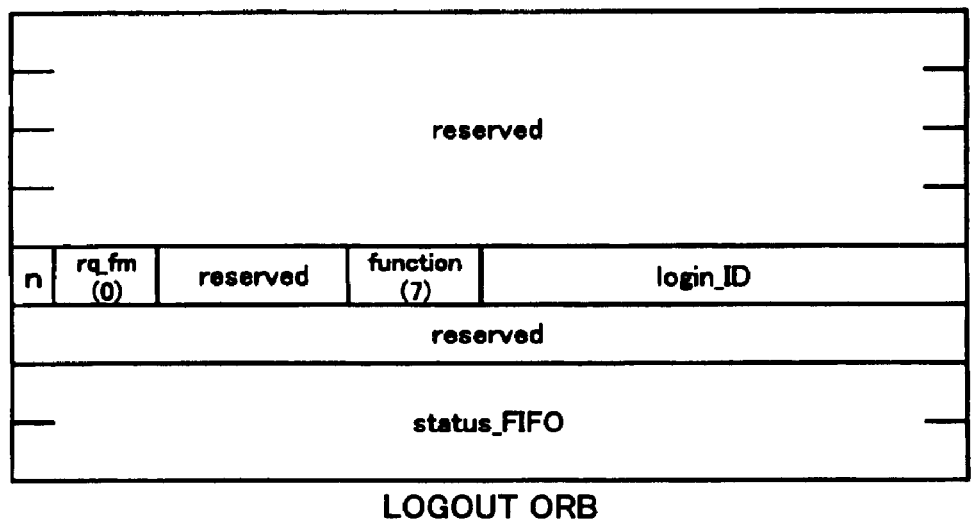
FIGS. 17A and 17B are diagrams showing formats of packets used in one embodiment of the present invention.

FIGS. 16A, 16B, and 17A show formats of packets of the login ORB, reconnect ORB, and logout ORB, respectively. These packets are defined in SBP-2. The login processing, reconnect processing, and logout processing described with reference to FIGS. 2, 10, and 11 can be implemented by utilizing these packets.

Figure 17B:
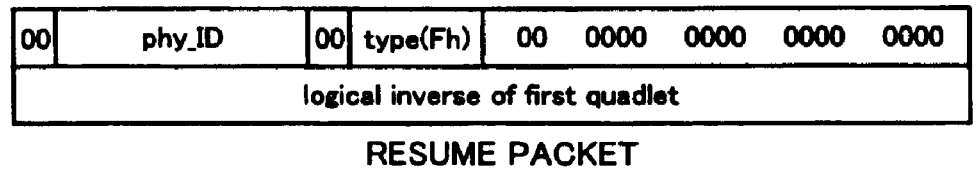

FIG. 17B shows a format of the resume packet used in the step S10 in FIG. 11. This packet is defined in P1394a as one of extended PHY packets.

In FIG. 17B, phy_ID is an identifier of a physical node which transmits the resume packet. type is information indicating the type of the extended PHY packet. An electronic instrument (or a node) which has been in a suspended state or the like can be allowed to transition to a resuming state by transferring the resume packet. The resume packet is broadcast. It is unnecessary to reply to the resume packet.

5. Physical Layer Circuit

Figure 18:
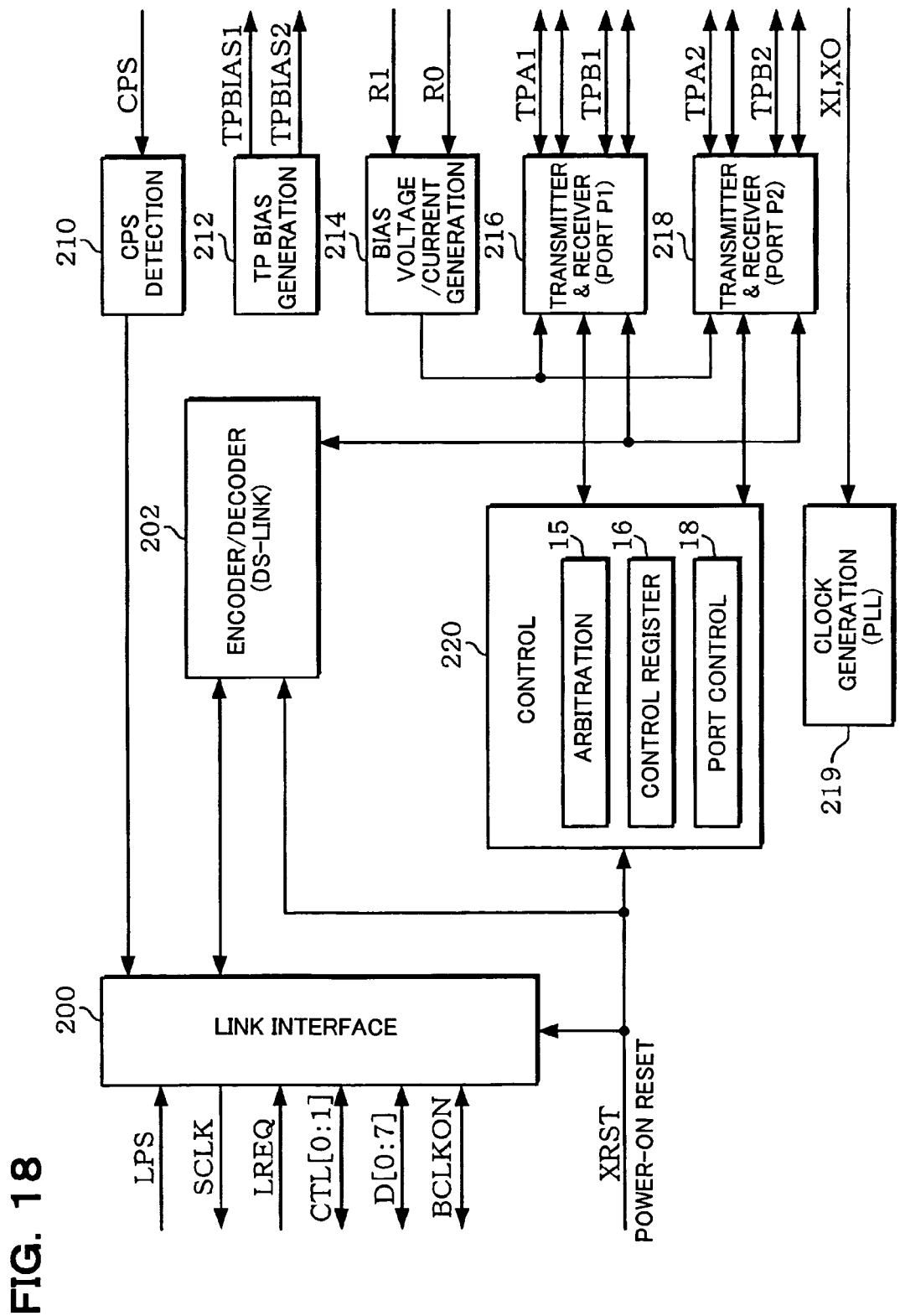
FIG. 18 is a diagram showing a configurational example of a physical layer circuit.

FIG. 18 shows a configuration example of the physical layer circuit 14. The physical layer circuit 14 does not necessarily include all the circuit blocks shown in FIG. 18. Some of the circuit blocks may be omitted.

A link interface circuit 200 is a circuit which performs interface processing between the physical layer circuit 14 and the link layer circuit 20. The link interface circuit 200 performs the interface processing by using a link power status signal LPS, a system clock signal SCLK, a request signal LREQ from the link layer circuit 20, a bidirectional control signal CTL[0:1], a bidirectional data signal D[0:7], a bus manager contender/link-on signal BCLKON, and the like. The meaning of these signals is defined in the P1394a standard.

XRST is a power-on reset signal which goes active when the power is turned on.

An encoder/decoder 202 is a circuit which encodes or decodes data by using a coding method called DS-LINK (Data-Strobe Link). In IEEE1394, half-duplex data transfer is performed by using two pairs of differential signals (data and strobe signals).

A CPS detection circuit 210 is a circuit which detects a cable power status CPS. A TPBIAS generation circuit 212 is a circuit which generates and supplies TPBIAS1 and TPBIAS2.

A bias voltage/current generation circuit 214 is a circuit which generates a bias voltage and the like by using external reference resistors connected with terminals R0 and R1, and supplies the bias voltage and the like to transmitters & receivers 216 and 218.

The transmitter & receiver 216 is a circuit which transmits or receives data by using two twisted pairs of signals TPA1 and TPB1 for the port P1. The transmitter & receiver 218 is a circuit which transmits or receives data by using two twisted pairs of signals TPA2 and TPB2 for the port P2. In the case of increasing the number of ports, transmitters & receivers may be provided for the number of additional ports.

A clock generation circuit 219 (PLL) is a circuit which generates internal clock signals such as a system clock signal.

A control circuit 220 is a circuit which controls the entire physical layer circuit 14, and includes the arbitration circuit 15, the control register 16, the port control circuit 18, and the like.

The arbitration circuit 15 is a circuit which arbitrates the right to use the bus between the nodes. The arbitration processing is performed during a subaction gap or an arbitration reset gap. In a normal asynchronous access method of IEEE1394, the opportunity for accessing the bus is equally given to the contending nodes.

The control register 16 is a register in which the commands to the physical layer circuit 14 and the like are set. The control register 16 is formed by a memory, D flip-flops, or the like. In the case of issuing the bus reset, "1" is set in a bit for the bus reset issue of the control register 16. The state control of the ports P1 and P2 can be performed by using the control register 16.

The port control circuit 18 is a circuit for controlling the ports P1 and P2 (a plurality of ports in a broad sense). The port control circuit 18 controls the ports P1 and P2 according to the instructions from the port control section 54 of the firmware 50 shown in FIG. 9.

P1394a (IEEE-1394a-2000) defines the following port states.

(1) Disabled State

A port in a disabled state does not output signals to TPA/TPB and TPBIAS signal lines. The port in a disabled state does not detect signals input to the TPA/TPB and TPBIAS signal lines. A connect detection circuit included in each of the transmitters & receivers 216 and 218 detects a change in cable connection state and outputs an interrupt to the link layer circuit 20. The connect detection circuit is a circuit for detecting the cable connection state, and operates (is enabled) in a period in which the port does not output TPBIAS.

(2) Disconnected State

A port in a disconnected state is not physically connected with the physical layer circuits of other nodes through a cable, and does not output signals to the TPA/TPB and TPBIAS signal lines. The port in a disconnected state does not detect signals input to the TPA/TPB and BIAS signal lines.

(3) Suspended State

A port in a suspended state is physically connected with the physical layer circuits of other nodes through a cable, but does not output signals to the TPA/TPB and TPBIAS signal lines. The port in a suspended state does not detect signals input to the TPA/TPB signal line. In the port in a suspended state, only the bias detection circuit and the connection detection circuit included in the transmitter & receiver 216 or 218 operate.

(4) Resuming State

A port in a resuming state is physically connected with the physical layer circuits of other nodes through a cable, and outputs signals to the TPBIAS signal line. If the port in a resuming state detects BIAS, the port transitions to the active state after a given time period has elapsed. In a resuming period, the port does not detect signals input to the TPA/TPB signal line.

(5) Active state

A port in an active (or an enabled) state is physically connected with the physical layer circuits of other nodes through a cable, and outputs signals to the TPA/TPB and TPBIAS signal lines. The port in an active state detects signals input to the TPA/TPB and TPBIAS signal lines.

These various states are defined in P1394a in order to realize power savings of the physical layer circuit. In this embodiment, the electronic instrument PC1 can be allowed to preferentially acquire the access right to the electronic instrument EP by making use of the disabled state defined for power savings.

The present invention is not limited to this embodiment. Various modifications and variations are possible within the spirit and scope of the present invention.

For example, the terms (IEEE1394, ATA/ATAPI, SBP-2, IPover1394, expansion device/notebook type personal computer/PDA/host computer, CD drive/built-in HDD, storage device, CPU, and the like) cited in the description in the specification as the terms in a broad sense (first interface standard, second interface standard, first higher level protocol of the first interface standard, second higher level protocol of the first interface standard, an electronic instrument, storage device, device, processor, and the like) may be replaced by the terms in a broad sense in another description in the specification.

Part of requirements of a claim of the present invention could be omitted from a dependent claim which depends on that claim. Moreover, part of requirements of any independent claim of the present invention could be made to depend on any other independent claim.

The configurations of the data transfer control system, electronic instrument, and physical layer circuit of the present invention are not limited to the configurations shown in FIGS. 9 and 18. Various modifications and variations are possible. For example, a part of each of the circuit blocks and the functional blocks shown in FIGS. 9 and 18 may be omitted, or the connection relation between the blocks may be modified. The second bus (BUS2) may be connected with a device other than the storage device, and may be a bus conforming to a standard other than ATA/ATAPI. The connection configuration of the physical layer circuit, the link layer circuit, and the packet buffer is not limited to the connection configuration shown in FIG. 9.

This embodiment illustrates the case where the functions of the port control section, the bus reset issue section, and the packet processing section are implemented by the firmware (program). However, a part or all of the functions of these sections may be implemented by the hardware.

The present invention is particularly useful for the bus reset in IEEE1394. However, the present invention may be applied to another reset which clears at least the node topology information.

This embodiment illustrates the case where the present invention is applied to data transfer of the IEEE1394 and SBP-2 standard. However, the present invention may be applied to data transfer of standards based on the same idea as IEEE1394 (P1394a) and SBP-2 (SBP) and standards developed from IEEE1394 and SBP-2.

The specification discloses the following matters about the configuration of the embodiments described above.

According to a first embodiment of the present invention, there is provided a data transfer control system for data transfer through a bus, comprising:

a port control section which controls a plurality of ports including a first port connected with a first electronic instrument and a second port connected with a second electronic instrument; and a bus reset issue section which issues a bus reset that clears node topology information, wherein the port control section sets the second port to a disabled state and the bus reset issue section issues the bus reset to cause the first electronic instrument connected with the first port to acquire an access right.

In this data transfer control system, the second port is set to a disabled state before the bus reset is issued. The bus reset is issued after the second port has been set to a disabled state. Therefore, the second electronic instrument connected with the second port can be prevented from acquiring the access right. This enables the first electronic instrument connected with the first port to preferentially acquire the access right (or a right to use a bus for the first port), or to preferentially log in.

In this data transfer control system, the port control section may set the second port to an enabled state after the bus reset has been issued to cause the first electronic instrument connected with the first port to acquire the access right.

This enables data transfer conforming to a first protocol (SBP-2 or SBP, for example) to be implemented between an electronic instrument in which this data transfer control system is incorporated and the first electronic instrument while implementing data transfer conforming to a second protocol (IPover1394, for example) between the first and second electronic instruments.

This data transfer control system may further comprise a packet processing section which performs processing for transferring a packet used to resume from a suspended state to the second electronic instrument connected with the second port after the second port has been set to an enabled state and the second electronic instrument has been detected to be in a suspended state.

This enables data transfer to be performed between the data transfer control system and the second electronic instrument which has been transitioned to a suspended state by setting the second port to a disabled state.

In this data transfer control system, the bus reset issue section may issue the bus reset after the packet used to resume from a suspended state has been transferred to the second electronic instrument.

The issue of the bus reset causes the node topology information to be cleared, enabling the second electronic instrument to be added as a new node, for example.

In this data transfer control system, the port control section may set the second port to a disabled state again after the second port has been set to an enabled state and the first electronic instrument connected with the first port has lost the access right.

The first electronic instrument may lose the access right when the first electronic instrument is rebooted, when a cable is removed from the first port, or when the first electronic instrument is unplugged in a software manner, for example.

According to a second embodiment of the present invention, there is provided a data transfer control system for data transfer through a bus, comprising:

a port control section which controls a plurality of ports including a first port connected with a first electronic instrument and a second port connected with a second electronic instrument, wherein the port control section sets the second port to a disabled state after the power for the data transfer control system has been turned on.

According to this data transfer control system, the second port is set to a disabled state (and the first port is set to an enabled state) on condition that the power for the data transfer control system (or an electronic instrument in which the data transfer control system is incorporated) is turned on (that is, after the power has been turned on). Therefore, the second electronic instrument connected with the second port can be prevented from acquiring the access right. This enables the first electronic instrument connected with the first port to preferentially acquire the access right.

In this data transfer control system, the power for the data transfer control system may be turned on after a port of the first electronic instrument has been connected with the first port.

Thus the first electronic instrument can preferentially acquire the access right after the port of the first electronic instrument has been connected with the first port (after an electronic instrument in which the data transfer control system is connected with the first electronic instrument).

Note that this data transfer control system may perform data transfer conforming to IEEE1394.

According to a third embodiment of the present invention, there is provided an electronic instrument for expanding a function of a first electronic instrument connected with a first port, the electronic instrument comprising:

any of the above-described data transfer control systems; and a plurality of ports including the first port connected with the first electronic instrument and a second port connected with a second electronic instrument.

In this electronic instrument, the port control section may set the second port to a disabled state after a port of the first electronic instrument has been connected with the first port and the power for the electronic instrument has been turned on.

According to a fourth embodiment of the present invention, there is provided a program which causes a data transfer control system to function as: a port control section which controls a plurality of ports including a first port connected with a first electronic instrument and a second port connected with a second electronic instrument; and a bus reset issue section which issues a bus reset that clears node topology information, wherein the port control section sets the second port to a disabled state and the bus reset issue section issues the bus reset to cause the first electronic instrument connected with the first port to acquire an access right.

According to a fifth embodiment of the present invention, there is provided a program which causes a data transfer control system to function as a port control section which controls a plurality of ports including a first port connected with a first electronic instrument and a second port connected with a second electronic instrument, wherein the port control section sets the second port to a disabled state after the power for the data transfer control system has been turned on.

According to a sixth embodiment of the present invention, there is provided a data transfer control method for data transfer through a bus, the method comprising:

controlling a plurality of ports including a first port connected with a first electronic instrument and a second port connected with a second electronic instrument to set the second port to a disabled state; and issuing a bus reset that clears node topology information after the second port has been set to a disabled state to cause the first electronic instrument connected with the first port to acquire an access right.

According to a seventh embodiment of the present invention, there is provided a data transfer control method for data transfer through a bus, the method comprising: controlling a plurality of ports including a first port connected with a first electronic instrument and a second port connected with a second electronic instrument; and setting the second port to a disabled state after the power for a data transfer control system has been turned on.

What is claimed is:

1. A data transfer control system for data transfer through a bus, comprising:
    a port controller that controls a plurality of ports including a first port for connecting with a first electronic instrument and a second port for connecting with a second electronic instrument; and
    a bus reset issue controller that issues a bus reset that clears node topology information,
    the port controller setting the second port to a disabled state and, after the second port is set to the disabled state, the bus reset issue controller issuing the bus reset to cause the first electronic instrument connected with the first port to acquire an access right.

2. The data transfer control system as defined in claim 1,
    the port controller setting the second port to an enabled state after the bus reset has been issued and the first electronic instrument connected with the first port has acquired the access right.

3. The data transfer control system as defined in claim 2, further comprising:
    a packet processor that performs processing for transferring a packet used to resume from a suspended state to the second electronic instrument connected with the second port after the second port has been set to an enabled state and the second electronic instrument has been detected to be in a suspended state.

4. The data transfer control system as defined in claim 3,
    the bus reset issue controller issuing a bus reset after the packet used to resume from the suspended state has been transferred to the second electronic instrument.

5. The data transfer control system as defined in claim 2,
    the port controller setting the second port to a disabled state again when the first electronic instrument connected with the first port has lost the access right after the second port has been set to an enabled state.

6. An electronic instrument for expanding a function of a first electronic instrument connected with a first port, the electronic instrument comprising:
    the data transfer control system as defined in claim 1; and
    a plurality of ports including the first port for connecting with the first electronic instrument and a second port for connecting with a second electronic instrument.

7. The electronic instrument as defined in claim 6,
    the port controller setting the second port to a disabled state when a port of the first electronic instrument has been connected with the first port and the power for the electronic instrument has been turned on.

8. A computer-readable storage medium that stores a program that causes a data transfer control system to function as:
    a port controller that controls a plurality of ports including a first port for connecting with a first electronic instrument and a second port for connecting with a second electronic instrument; and a bus reset issue controller that issues a bus reset that clears node topology information,
    the port controller setting the second port to a disabled state and, after the second port is set to a disabled state, the bus reset issue controller issuing the bus reset to cause the first electronic instrument connected with the first port to acquire an access right.

9. A data transfer control method for data transfer through a bus, the method comprising:
    controlling a plurality of ports including a first port for connecting with a first electronic instrument and a second port for connecting with a second electronic instrument to set the second port to a disabled state; and
    issuing a bus reset that clears node topology information after the second port has been set to a disabled state to cause the first electronic instrument connected with the first port to acquire an access right.

10. The data transfer control method as defined in claim 9, further comprising:
    setting the second port to an enabled state after the bus reset has been issued and the first electronic instrument connected with the first port has acquired the access right.

11. The data transfer control method as defined in claim 10, further comprising:
    transferring a packet used to resume from a suspended state to the second electronic instrument connected with the second port after the second port has been set to an enabled state and the second electronic instrument has been detected to be in a suspended state.

12. The data transfer control method as defined in claim 11, further comprising:
    issuing a bus reset after the packet used to resume from the suspended state has been transferred to the second electronic instrument.

13. The data transfer control method as defined in claim 10, further comprising:
    setting the second port to a disabled state again when the first electronic instrument connected with the first port has lost the access right after the second port has been set to an enabled state.

* * * * *